(12) United States Patent
Langsdorf et al.

(10) Patent No.: US 11,376,191 B2
(45) Date of Patent: Jul. 5, 2022

(54) GLASS CONTAINER WITH AN IMPROVED BOTTOM GEOMETRY

(71) Applicant: Schott AG, Mainz (DE)

(72) Inventors: Andreas Langsdorf, Ingelheim (DE); Peter Thomas, Koblenz (DE); Florian Maurer, Griesheim (DE); Hanspeter Kummer, Müllheim (DE); Fatih Mutlu, Neuenburg (DE)

(73) Assignee: Schott AG, Mainz (DE)

( * ) Notice: Subject to any disclaimer, the term of this patent is extended or adjusted under 35 U.S.C. 154(b) by 495 days.

(21) Appl. No.: 16/394,519

(22) Filed: Apr. 25, 2019

(65) Prior Publication Data

US 2019/0350806 A1 Nov. 21, 2019

(30) Foreign Application Priority Data

May 18, 2018 (EP) .................................... 18173310

(51) Int. Cl.
*A61J 1/00* (2006.01)
*B65D 1/02* (2006.01)
(Continued)

(52) U.S. Cl.
CPC .............. *A61J 1/00* (2013.01); *B65D 1/0261* (2013.01); *C03C 17/30* (2013.01); *C03C 21/00* (2013.01)

(58) Field of Classification Search
CPC .. B65D 1/0276; B65D 1/0261; B65D 1/0223; B65D 13/02; B65D 23/0814;
(Continued)

(56) References Cited

U.S. PATENT DOCUMENTS 3,178,049 A * 4/1965 Cottet ................... B65D 25/34
428/34.7
3,799,380 A * 3/1974 Hashimoto ............ C08G 18/10
215/341
(Continued)

FOREIGN PATENT DOCUMENTS

DE 689 280 3/1940
DE 977 540 12/1966
(Continued)

OTHER PUBLICATIONS

Translation of JP200547537A, Saito et al., Feb. 24, 2005, Paragraphs 6 and 13. (Year: 2005).*

(Continued)

*Primary Examiner* — Robert J Hicks
(74) *Attorney, Agent, or Firm* — Taylor IP, P.C.

(57) ABSTRACT

A glass container for packaging a pharmaceutical composition including a glass tube with a first end and a second end, the glass tube having a wall thickness $d_w$ and an outer diameter $d_c$, a glass bottom with an outer area, the glass bottom closes the glass tube at the first end, and a curved glass heel extending from the outer area of the glass bottom to the first end of the glass tube. The curved glass heel is defined by an outer radius $r_o$, an inner radius $r_i$, and a thickness of the glass $d_h$ in the curved glass heel and:

$[100 \times (d_h^3 \times r_i)/(d_w \times d_c^2)] + (4.4 \text{ mm}^2/d_c) > 0.55 \text{ mm}.$

20 Claims, 13 Drawing Sheets

(51) Int. Cl.
*C03C 17/30* (2006.01)
*C03C 21/00* (2006.01)

(58) Field of Classification Search
CPC .... B65D 23/0807; B65D 25/34; B65D 25/14; A61J 1/03; A61J 1/00
USPC ........ 215/373, 372, 371, 370; 220/606, 608, 220/605, 604, 623; 206/535; 65/153, 66
See application file for complete search history.

(56) References Cited

U.S. PATENT DOCUMENTS

| | | | |
|---|---|---|---|
| 4,420,578 A | 12/1983 | Hagens et al. | |
| 4,978,016 A * | 12/1990 | Hayes | B29C 57/00 215/252 |
| 5,009,324 A * | 4/1991 | Ochs | B65D 41/04 215/274 |
| 5,263,615 A * | 11/1993 | Anderson | B65D 1/0223 222/212 |
| 6,866,158 B1 * | 3/2005 | Sommer | B29C 67/246 215/12.1 |
| 7,150,372 B2 | 12/2006 | Lisch et al. | |
| 2003/0134060 A1 | 7/2003 | Walther et al. | |
| 2004/0007280 A1 | 1/2004 | Rausch et al. | |
| 2006/0267250 A1 | 11/2006 | Gerretz et al. | |
| 2011/0006028 A1 | 1/2011 | Caldwell | |
| 2013/0171456 A1 | 7/2013 | Fadeev et al. | |
| 2015/0102004 A1 * | 4/2015 | Kelly | B65D 1/0223 215/44 |
| 2015/0147497 A1 * | 5/2015 | Brouwer | C03C 3/087 428/34.4 |
| 2016/0107918 A1 | 4/2016 | Delgado Carranza | |
| 2018/0265243 A1 * | 9/2018 | Gutekunst | B65D 1/0215 |

FOREIGN PATENT DOCUMENTS

| | | | |
|---|---|---|---|
| DE | 196 22 550 A1 | 12/1997 | |
| EP | 1 593 658 A1 | 11/2005 | |
| GB | 363019 A * | 12/1931 | ........... B65D 1/0246 |
| JP | 2002-65811 A | 3/2002 | |
| JP | 2003-28829 A | 1/2003 | |
| JP | 2005-47537 A | 2/2005 | |
| JP | 2010-274950 A | 12/2010 | |
| WO | 81/02572 A1 | 9/1981 | |
| WO | 91/19606 A1 | 12/1991 | |
| WO | 2014/105350 A2 | 7/2014 | |

OTHER PUBLICATIONS

Translation of JP2002065811A, Arakawa et al., Mar. 5, 2002, Paragraph 11. (Year: 2002).*
Indian Office Action dated Feb. 24, 2020 for Indian Application No. 201914016472 (5 pages).
English Translation of Japanese Office Action dated Jul. 29, 2020 for Japanese Application No. 2019-084333 (5 pages).
English Translation of Korean Office Action dated Sep. 11, 2020 for Korean Application No. 10-2019-0048206 (8 pages).
Canadian Office Action dated May 5, 2020 for Canadian Application No. 3,041,241 (5 pages).
Japanese Office Action dated Jan. 17, 2022 for Japanese Patent Application No. 2019-084333 (2 pages).
English translation of Japanese Office Action dated Jan. 17, 2022 for Japanese Patent Application No. 2019-084333 (2 pages).

* cited by examiner

105

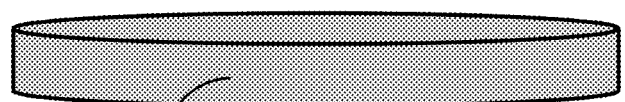
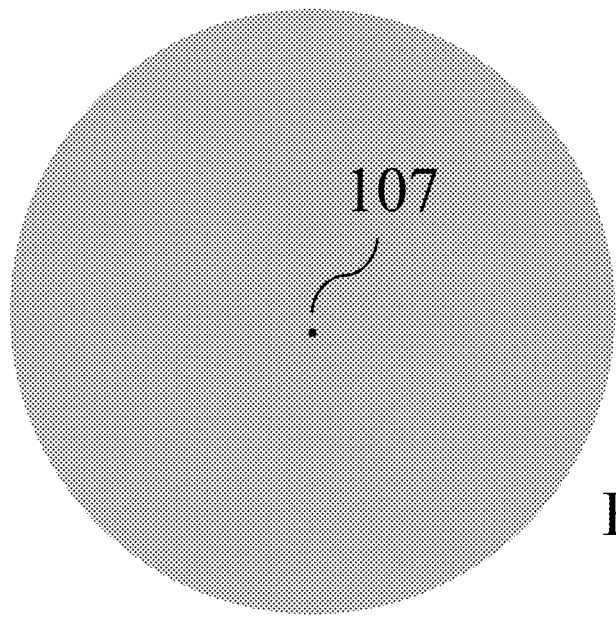
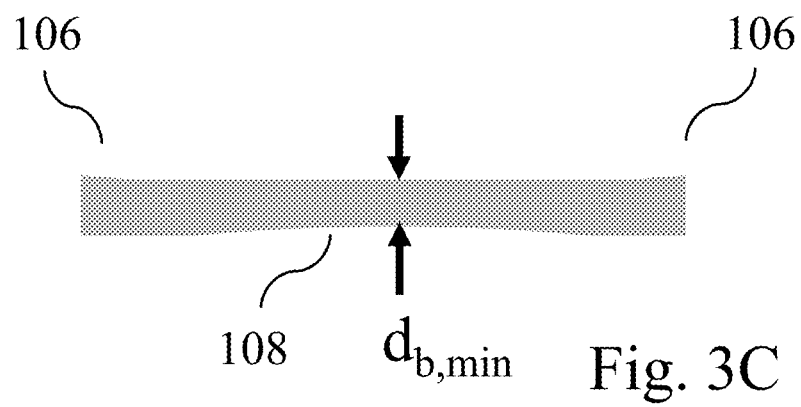

121

GLASS CONTAINER WITH AN IMPROVED BOTTOM GEOMETRY

BACKGROUND OF THE INVENTION

1. Field of the Invention

The present invention relates to a glass container, and, more particularly, to a glass container for packaging a pharmaceutical composition. Further, the invention further relates to a process for the preparation of a closed glass container.

2. Description of the Related Art

In the pharmaceutical industry, containers are used for the primary packaging of drugs. Among the traditionally most used materials is a glass container, as it ensures stability, visibility, endurance, rigidity, moisture resistance, ease of capping, and economy. The glass containers for medicinal purposes currently on the market include glass containers, made from glass tubing and blow-molded glass containers. The manufacturing methods for tubing-based glass containers and blow-molded glass containers are widely known. Tubing based glass containers are made from prefabricated glass tubing (mother tube) by shaping and separation. In a typical manufacturing process, a glass tube is loaded into the head of a rotary machine, and then, while rotating around its major axis, the tube is heated to its softening point by a flame and is pulled along its major axis for stretching and spreading the portion that has been subjected to heat softening to create and shape the bottom of the desired container. Tubular glass containers include vials, ampoules, bottles, cylindrical injector and syringe bodies, whose shape and size are standard. Blow-molded glass containers are made by shaping a glass melt directly by blowing or press-and-blow processes. The blow-molded glass containers include, for example, spray and infusion bottles, such as those described in DE 196 22 550 A1. However blow-molded glass containers do typically have much higher tolerances in the wall thickness including local sections with higher and lower wall thicknesses. Due to refraction of light they are typically not suitable for optical inspection of a filled container through the glass wall, what renders them unsuitable for many pharmaceutical applications.

Pharmaceutical vials made from a tube are usually manufactured according to existing ISO-standards ("ISO-vials"). These ISO-standards are usually based on a defined thickness of the tube wall defining the thickness of the cylindrical body. In the reshaped areas (i.e. the curved areas surrounding the bottom of the glass containers and forming the "heel" of a glass container) wall thicknesses can occur that deviate from the thickness of the tube wall. The ISO-standards take into account these facts by specifying a minimum thickness of the glass bottom. In case of a vial with a size designation "2R" according to DIN EN ISO 8362-1:2016-06 the minimum thickness of the glass bottom is 0.6 mm (i.e. 60% of the thickness of the glass tube). Actually, the thickness of the glass bottom is within a range between the minimum value required by the ISO-standards and the wall thickness of the mother tube. The thickness in the radius region of the bottom, which has arisen from bending over from the mother tube for the formation of the bottom, is usually very close to the wall thickness of the mother tube. The internal geometries, such as the glass thickness and the inner radius in the ground heel, are usually not specified. The inner radius is usually determined by the outer radius and the wall thickness in the radius region, which in turn basically corresponds to the wall thickness of the mother tube.

The above described pharmaceutical glass containers should have sufficiently high strength, particularly if they are filled in automated capping machines in which substantial axial loads are applied to the vials. Higher axial loads may also be observed when glass vials are used in automated sampling machines in scientific laps or medical institutions as well as during stoppering, shipping, and storage of glass vials. In addition to a certain resistance to axial loads glass containers should also display sufficiently high burst strength. Burst pressure testing is, for example, appropriate for assessing container strength during lyophilisation to find the weakest point on the interior or exterior surface of a container. Burst strength of pharmaceutical glass containers becomes important if pharmaceutical preparations, after they have been filled in a glass container, are subjected to lyophilisation.

As the use of glass containers in pharmaceutical industry only allows a very low failure probability upon application of mechanical stress or pressure changes, glass containers intended for the filling of pharmaceutical preparations should therefore be characterized by sufficiently high strength, particularly by the ability to withstand high axial loads and by sufficiently high burst strength. Although ISO-vials are already adapted to these increased stability requirements, the strength of glass containers can be further improved. For example, to increase the strength of glass containers the glass surface of the containers can be hardened, for example by way of chemical treatments as disclosed in WO 1981/002572 A1 or in EP 0 495 936 A1. However, such a hardening process requires an additional process step in the manufacturing of glass containers and—in case of chemical treatments—also leads to a modification of the glass surface. Therefore, a chemically strengthened glass surface typically requires a new approval of the glass container.

What is needed in the art is a cost-effective glass container for pharmaceutical packaging which has an improved burst strength, and which also has a sufficiently high resistance to axial loads.

SUMMARY OF THE INVENTION

The present invention provides a glass container for pharmaceutical packaging. The glass container may be based on glass tubing and suitable for optical inspection through the glass wall. The glass container is not increased in weight compared to typical ISO-vials having the same interior volume for more than 50%, preferably not more than 25%.

The present invention in one form is directed to a glass container that includes as container parts:
i) a glass tube with a first end and a second end, the glass tube having a wall thickness $d_w$ and an outer diameter $d_c$;
ii) a glass bottom, wherein the glass bottom closes the glass tube at the first end;
iii) a curved glass heel extending from an outer area of the glass bottom to the first end of the glass tube;
wherein the curved glass heel is defined by an outer radius ($r_o$), an inner radius ($r_i$) and a thickness of the glass ($d_h$) in the curved glass heel and wherein the following condition is fulfilled:

$$[100 \times (d_h^3 \times r_i)/(d_w \times d_c^2)] + (4.4 \text{ mm}^2/d_c) > 0.55 \text{ mm},$$

preferably $[100 \times (d_h^3 \times r_i)/(d_w d \times d_c^2)] + (4.4 \text{ mm}^2/d_c) > 0.75$ mm, more preferably $[100\times(d_h^3\times r_i)/(d_w\times d_c^2)]+(4.4\ mm^2/d_c)>1.00$ mm, even more preferably $[100\times(d_h^3\times r_i)/(d_w\times d_c^2)]+(4.4\ mm^2/d_c)>1.50$ mm and most preferably $[100\times(d_h^3\times r_i)/(d_w\times d_c^2)]+(4.4\ mm^2/d_c)>2.00$ mm.

The present invention in another form is directed to a process for making a glass container, comprising as process steps:

I) loading a glass tube having a first end and a second end into a machine, preferably a rotary machine, the glass tube having a wall thickness $d_w$ and an outer diameter $d_c$;

II) heating the glass tube, while rotating around its major axis, to a temperature above its glass transition temperature, preferably above its softening temperature, with a heating element, preferably with a flame;

III) pulling the heated glass tube, while rotating around its major axis, for stretching and creating a container closure;

IV) while the heated glass tube is still rotating around its major axis, shaping the container closure, preferably while still having a temperature above its glass transition temperature, preferably above its softening temperature, so as to obtain a glass bottom and a curved glass heel via which the glass bottom is connected to the glass tube, for the formation of a glass container, wherein the curved glass heel is defined by an outer radius ($r_o$), an inner radius ($r_i$) and a thickness of the glass ($d_h$) in the curved glass heel and wherein shaping in process step IV) is performed to adjust $r_o$ and $d_h$, preferably to adjust $r_o$, $r_i$ and $d_h$, in such a way that the following condition is fulfilled:

$$[100\times(d_h^3\times r_i)/(d_w\times d_c^2)]+(4.4\ mm^2/d_c)>0.55\ mm,$$

preferably $[100\times(d_h^3\times r_i)/(d_w\times d_c^2)]+(4.4\ mm^2/d_c)>0.75$ mm, more preferably $[100\times(d_h^3\ 33\ r_i)/(d_w\times d_c^2)]+(4.4\ mm^2/d_c)>1.00$ mm, even more preferably $[100\times(d_h^3\times r_i)/(d_w\times d_c^2)]+(4.4\ mm^2/d_c)>1.50$ mm and most preferably $[100\times(d_h^3\times r_i)/(d_w\times d_c^2)]+(4.4\ mm^2/d_c)>2.00$ mm.

The "softening temperature" of the glass is the temperature at which the glass has a viscosity (determined according to ISO 7884-6:1987) of $10^{7.6}$ dPaxsec.

In process step IV) adjustment of $r_o$ and $d_h$, preferably adjustment of $r_o$, $r_i$ and $d_h$, is accomplished by an adjustment of the rotation speed of the rotary machine, by an adjustment of the heating element, preferably by an adjustment of the shape of the flame, the position of the flame at which the glass is subjected to heat softening or a combination of these measures, by using molding tools that act on predetermined positions of the outer surface of the glass heel, preferably by using a molding roller, or by a combination of at least two of these measures. Shaping in process step IV) comprises the sub-steps of IVa) heating the glass bottom to a temperature above its glass transition temperature, preferably above its softening temperature, wherein the peripheral zones of the glass bottom are heated to a larger extent compared to the middle section of the glass bottom, thereby also melting the wall of the glass tube in a region of the glass tube that is in contact with the curved glass heel and thereby also increasing the mass of molten glass in that region of the curved glass heel;

IVb) shaping the exterior surface of the curved glass heel, while still having a temperature above its glass transition temperature, preferably above its softening temperature, by way of a molding tool, preferably a molding roller, that contacts the exterior surface of the curved glass heel.

Furthermore, shaping in process step IV) may be performed in such a way that $d_h$ is in the range from 1.0 to 5.0 mm, preferably in the range from 1.05 to 3.0 mm, more preferably in the range from 1.15 to 2.5 mm, even more preferably in the range from 1.3 to 2.0 mm and most preferably in the range from 1.4 to 1.9 mm. Shaping in process step IV) may be performed in such a way that $r_o$ is in the range from 0.5 to 4.0 mm, preferably in the range from 1.1 to 3.0 mm, more preferably in the range from 1.2 to 2.5 mm, even more preferably in the range from 1.3 to 2.0 mm and most preferably in the range from 1.4 to 1.7 mm. Shaping in process step IV) may be performed in such a way that $r_i$ is in the range from 0.6 to 4.0 mm, preferably in the range from 0.7 to 3.0 mm, more preferably in the range from 0.8 to 2.5 mm, even more preferably in the range from 0.85 to 2.0 mm and most preferably in the range from 0.9 to 1.6 mm. Shaping in process step IV) may be performed in such a way that the following condition is fulfilled:

$$r_i>0.7\ mm,$$

preferably $r_i>0.8$ mm,
more preferably $r_i>0.9$ mm,
even more preferably $r_i>1.0$ mm and
most preferably $r_i>1.2$ mm.

Shaping in process step IV) may be performed in such a way that the following condition is fulfilled:

$$r_i+d_h-r_o>0\ mm,$$

preferably $r_i+d_h-r_o>0.1$ mm,
more preferably $r_i+d_h-r_o>0.25$ mm,
even more preferably $r_i+d_h-r_o>0.5$ mm and
most preferably $r_i+d_h-r_o>0.75$ mm.

Shaping in process step IV) may be performed in such a way that the following condition is fulfilled:

$$r_o<1.4\times d_w,$$

preferably $r_o<1.3\times d_w$,
more preferably $r_o<1.2\times d_w$,
even more preferably $r_o<1.0\times d_w$ and
most preferably $r_o<0.8\times d_w$.

Shaping in process step IV) may be performed in such a way that the following condition is fulfilled:

$$d_h>1.05\times d_w,$$

preferably $d_h>1.15\times d_w$,
more preferably $d_h>1.25\times d_w$,
even more preferably $d_h>1.4\times d_w$ and
most preferably $d_h>1.6\times d_w$.

Shaping in process step IV) may be performed in such a way that the following condition is fulfilled:

$$d_h-d_{cgb}>0.5\ mm,$$

preferably $d_h-d_{cgb}>1.0$ mm,
more preferably $d_h-d_{cgb}>1.5$ mm,
even more preferably $d_h-d_{cgb}>2.0$ mm and
most preferably $d_h-d_{cgb}>3.0$ mm Shaping in process step IV) may be performed in such a way that $d_{cgb}$ is in the range from 0.6 to 2.5 mm, preferably in the range from 1.0 to 2.0 mm, more preferably in the range from 1.05 to 1.7 mm, even more preferably in the range from 1.1 to 1.6 mm and most preferably in the range from 1.2 to 1.5 mm.

It should be appreciated that the glass tube used in process step I) may be a cylindrical glass tube and wherein the glass bottom shaped in process step IV) may be a circular glass bottom. Shaping in process step IV) may also be performed in such a way that the circular glass bottom has a thickness that varies within the area from the center of the circular glass bottom to the outer area of the circular glass bottom, wherein the minimum glass thickness of the circular glass bottom is db,mi$_n$ and wherein the following condition is fulfilled:

$d_h/d_{b,min} < 3.0$, preferably $d_h/d_{b,min} < 2.5$,
more preferably $d_h/d_{b,min} < 2.0$,
even more preferably $d_h/d_{b,min} < 1.6$ and
most preferably $d_h/d_{b,min} < 1.2$.

Furthermore, shaping in process step IV) is performed in such a way that $d_{b,min}$ is in the range from 0.6 to 3.0 mm, preferably in the range from 0.8 to 2.5 mm, more preferably in the range from 1.0 to 2.0 mm, even more preferably in the range from 1.2 to 1.8 mm and most preferably in the range from 1.4 to 1.7 mm. Shaping in process step IV) may also be performed in such a way that a contour of the cross section of the circular glass bottom on the side directed to the interior side of the glass container over whole diameter of the circular glass bottom may not have more than two inflection points. Shaping in process step IV) may be performed in such a way that the circular bottom may have a bottom diameter $d_{bottom}$, wherein $d_{bottom} = d_{outer} - 2 \times r_o$, wherein $d_{outer}$ corresponds to the outer diameter of the glass tube measured at the first end of the glass tube and wherein $d_{bottom}$ is in the range from 10 to 50 mm, preferable in the range from 12 to 30 mm and more preferably in the range from 13 to 25 mm. Shaping in process step IV) may also be performed in such a way that the outer surface of the curved glass heel has the form of a circular arc $l_o$ and wherein $l_o$ has a length of $2 \times \pi \times r_o/4$. Shaping in process step IV) is performed in such a way that the outer surface of the curved glass heel has the form of a circular arc $l_o$ and wherein $l_o$ has a length in the range from $(50°/360°) \times 2\pi \times r_o$ to $(80°/360°) \times 2\pi \times r_o$, more preferably in the range from $(60°/360°) \times 2\pi \times r_o$ to $(80°/360°) \times 2\pi = r_o$. Shaping in process step IV) may also be performed in such a way that the following condition is fulfilled:

$100 \times (d_h^3 \times r_i)/(d_w \times d_c^2)] + (4.4 \text{ mm}^2/d_c) < 20 \text{ mm}$, preferably $[100 \times (d_h^3 \times r_i)/(d_w \times d_c^2)] + (4.4 \text{ mm}^2/d_c) < 10$ mm, and
more preferably $[100 \times (d_h^3 \times r_i)/(d_w \times d_c^2)] + (4.4 \text{ mm}^2/d_c) < 5$ mm.

The glass container that is formed in process step IV) may be a packaging container for a medical or a pharmaceutical packaging good or both. The glass container that is formed in process step IV) may also be a vial. The glass of the glass tube provided in process step I) is of a type selected from the group consisting of a borosilicate glass, an aluminosilicate glass, soda lime glass and fused silica. The glass container obtained in process step IV) may be thermally tempered, chemically tempered or both. Methods for thermally and chemically tempering glass are, for example, disclosed in EP 1 593 658 A1.

The invention in another form is directed to a process comprising as process steps:
a) providing a glass container according to the present invention;
b) inserting a pharmaceutical composition into the interior volume $V_i$ of the glass container; and
c) closing the glass container.

The closing in the process step c) preferably includes contacting the glass container with a closure, preferably a lid, preferably covering an opening of the glass container with the closure, and joining the closure to the hollow body. The joining preferably comprises creating a form-fit of the glass container, preferably the flange of the glass container, with the closure. The form-fit is preferably created via a crimping step. The process may be a process for packaging the pharmaceutical composition.

The invention in another form is directed to a closed glass container obtainable by the process of the invention.

The invention in another form is directed to a process comprising as process steps:
A) providing the glass container according to the present invention or the closed glass container obtainable by process according to the invention; and
B) administering the pharmaceutical composition to a patient.

The invention in another form is directed to a use of the glass container according to the present invention for packaging a pharmaceutical composition. The packaging may include inserting the pharmaceutical composition into the interior volume and closing the glass container.

Glass Container

The glass container according to the invention may have any size or shape which the skilled person deems appropriate in the context of the invention. The head region of the glass container may include an opening, which allows for inserting a pharmaceutical composition into the interior volume of the glass container. The glass container may include as container parts a glass tube with a first end and a second end, a glass bottom that closes the glass tube at the first end and a curved glass heel extending from an outer area of the glass bottom to the first end of the glass tube. The glass container is of a one-piece design that is prepared by providing a glass tube, in form of a hollow cylinder, forming the glass bottom of the glass container and a curved glass heel via which the glass bottom is connected to the glass tube, thereby closing the glass tube at this end. The glass container may be a pharmaceutical glass container, more preferably one selected from the group consisting of a vial, an ampoule or a combination thereof, wherein a vial may be preferred.

For the use in this document, the interior volume Vi represents the full volume of the interior of the glass container. This volume may be determined by filling the interior of the glass container with water up to the brim and measuring the volume of the amount of water which the interior can take up to the brim. Hence, the interior volume as used herein is not a nominal volume as it is often referred to in the technical field of pharmacy. This nominal volume may for example be less than the interior volume by a factor of about 0.5.

Glass

The glass of the container may be any type of glass and may consist of any material or combination of materials which the skilled person deems suitable in the context of the invention. The glass may be suitable for pharmaceutical packaging. The glass may be of type I, for example type I b, in accordance with the definitions of glass types in section 3.2.1 of the European Pharmacopoeia, 7th edition from 2011. Additionally or alternatively preferable to the preceding, the glass is selected from the group consisting of a borosilicate glass, an aluminosilicate glass, soda lime glass and fused silica; or a combination of at least two thereof. For the use in this document, an aluminosilicate glass is a glass which has a content of $Al_2O_3$ of more than 8 wt.-%, preferably more than 9 wt.-%, particularly preferable in a range from 9 to 20 wt.-%, in each case based on the total weight of the glass. A preferred aluminosilicate glass has a content of $B_2O_3$ of less than 8 wt.-%, preferably at maximum 7 wt.-%, particularly preferably in a range from 0 to 7 wt.-%, in each case based on the total weight of the glass. For the use in this document, a borosilicate glass is a glass which has a content of $B_2O_3$ of at least 1 wt.-%, preferably at least 2 wt.-%, more preferably at least 3 wt.-%, more preferably at least 4 wt.-%, even more preferably at least 5 wt.-%, particularly preferable in a range from 5 to 15 wt.-%, in each case based on the total weight of the glass. A preferred borosilicate glass has a content of $Al_2O_3$ of less than 7.5 wt.-%, preferably less than 6.5 wt.-%, particularly preferably in a range from 0 to 5.5 wt.-%, in each case based on the total weight of the glass. In a further aspect, the borosilicate glass has a content of Al2O3 in a range from 3 to 7.5 wt.-%, preferably in a range from 4 to 6 wt.-%, in each case based on the total weight of the glass.

A glass which is further preferred according to the invention is essentially free from B. Therein, the wording "essentially free from B" refers to glasses which are free from B which has been added to the glass composition by purpose. This means that B may still be present as an impurity, but preferably at a proportion of not more than 0.1 wt.-%, more preferably not more than 0.05 wt.-%, in each case based on the weight of the glass.

Curved Glass Heel

An essential element of the glass container according to the present invention is that the curved glass heel iii) connects the outer area of the glass bottom ii) with the first end of the glass tube i) and that is formed in process step IV) of the process 1 according to the present invention when shaping the container closure. The curved glass heel at the exterior side of the glass container and at the interior side of the glass container preferably follows the form of a circular arc and may have an inner radius $r_i$ and an outer radius $r_o$. The thickness of the glass in the curved glass heel is $d_h$.

Pharmaceutical Composition

In the context of the invention, every pharmaceutical composition which the skilled person deems suitable comes into consideration. A pharmaceutical composition is a composition comprising at least one active ingredient. The active ingredient may be a vaccine. The pharmaceutical composition may be fluid or solid or both, wherein a fluid composition is particularly preferred herein. A preferred solid composition is granular such as a powder, a multitude of tablets or a multitude of capsules. A further preferred pharmaceutical composition is a parenterialium, i.e. a composition which is intended to be administered via the parenteral route, which may be any route which is not enteral. Parenteral administration can be performed by injection, e.g. using a needle (usually a hypodermic needle) and a syringe, or by the insertion of an indwelling catheter.

According to an embodiment of the glass container according to the present invention the glass container is a vial with an overflow capacity equal to or larger than 1 ml up to maximal 5 ml, preferably a vial with a size designation "2R" according to DIN EN ISO 8362-1:2016-06, wherein it is furthermore preferred that at least one, preferably all of the following conditions i) to vi) is/are fulfilled:

i) $d_h$ is in the range from 0.5 to 3 mm, preferably in the range from 1.05 to 2.50 mm and even more preferably in the range from 1.3 to 1.8 mm;

ii) $r_i$ is in the range from 0.3 to 4 mm, preferably in the range from 0.55 to 2 mm and even more preferably in the range from 0.7 to 1.3 mm;

iii) $d_w$ is in the range from 0.4 to 2 mm, preferably in the range from 0.8 to 1.3 mm and even more preferably in the range from 0.9 to 1.15 mm;

iv) $d_c$ is in the range from 10 to 19 mm, preferably in the range from 15 to 17 mm and even more preferably in the range from 15.85 to 16.15 mm;

v) $[100 \times (d_h^3 \times r_i)/(d_w \times d_c^2)] + (4.4 \text{ mm}^2/d_c)$ is in the range from 0.45 to 10 mm, preferably in the range from 0.55 to 2.50 mm, more preferably in the range from 0.9 to 1.8 mm and even more preferably in the range from 1.3 to 1.7 mm;

vi) $d_{bottom}$ is in the range from 10 to 15.8 mm, preferably in the range from 13.7 to 15 mm and even more preferably in the range from 13.9 to 14.5 mm.

According to another embodiment of the glass container according to the present invention the glass container is a vial with an overflow capacity of larger than 4 ml up to maximal 8 ml, preferably a vial with a size designation "4R" according to DIN EN ISO 8362-1:2016-06, wherein it is furthermore preferred that at least one, preferably all of the following conditions i) to vi) is/are fulfilled:

i) $d_h$ is in the range from 0.5 to 3 mm, preferably in the range from 1.05 to 2.50 mm and even more preferably in the range from 1.3 to 1.8 mm;

ii) $r_i$ is in the range from 0.3 to 4 mm, preferably in the range from 0.55 to 2 mm and even more preferably in the range from 0.7 to 1.3 mm;

iii) $d_w$ is in the range from 0.4 to 2 mm, preferably in the range from 0.8 to 1.3 mm and even more preferably in the range from 0.9 to 1.15 mm;

iv) $d_c$ is in the range from 10 to 19 mm, preferably in the range from 15 to 17 mm and even more preferably in the range from 15.85 to 16.15 mm;

v) $[100 \times (d_h^3 \times r_i)/(d_w' d_c^2)] + (4.4 \text{ mm}^2/d_c)$ is in the range from 0.45 to 10 mm, preferably in the range from 0.55 to 2.50 mm, more preferably in the range from 0.9 to 1.8 mm and even more preferably in the range from 1.3 to 1.7 mm;

vi) $d_{bottom}$ is in the range from 10 to 15.8 mm, preferably in the range from 13.7 to 15 mm and even more preferably in the range from 13.9 to 14.5 mm.

According to another embodiment of the glass container according to the present invention the glass container is a vial with an overflow capacity of larger than 8 ml up to maximal 10.75 ml, preferably a vial with a size designation "6R" according to DIN EN ISO 8362-1:2016-06, wherein it is furthermore preferred that at least one, preferably all of the following conditions i) to vi) is/are fulfilled:

i) $d_h$ is in the range from 0.5 to 3 mm, preferably in the range from 1.05 to 2.50 mm and even more preferably in the range from 1.3 to 1.8 mm;

ii) $r_i$ is in the range from 0.6 to 8 mm, preferably in the range from 1.1 to 4 mm and even more preferably in the range from 1.4 to 2.6 mm;

iii) $d_w$ is preferably in the range from 0.9 to 1.15 mm;

iv) $d_c$ is in the range from 19.05 to 23 mm, preferably in the range from 21 to 22.5 mm and even more preferably in the range from 21.8 to 22.2 mm;

v) $[100 \times (d_h^3 \times r_i)/(d_w \times d_c^2)] + (4.4 \text{ mm}^2/d_c)$ is in the range from 0.40 to 10 mm, preferably in the range from 0.55 to 2.50 mm, more preferably in the range from 0.9 to 1.8 mm and even more preferably in the range from 1.3 to 1.7 mm;

vi) $d_{bottom}$ is in the range from 13.85 to 23.8 mm, preferably in the range from 21 to 23 mm and even more preferably in the range from 21.5 to 22.5 mm.

According to another embodiment of the glass container according to the present invention the glass container is a vial with an overflow capacity of larger than 10.75 ml up to maximal 12.5 ml, preferably a vial with a size designation "8R" according to DIN EN ISO 8362-1:2016-06, wherein it is furthermore preferred that at least one, preferably all of the following conditions i) to vi) is/are fulfilled:

i) $d_h$ is in the range from 0.5 to 3 mm, preferably in the range from 1.05 to 2.50 mm and even more preferably in the range from 1.3 to 1.8 mm;
ii) $r_i$ is in the range from 0.6 to 8 mm, preferably in the range from 1.1 to 4 mm and even more preferably in the range from 1.4 to 2.6 mm;
iii) $d_w$ is preferably in the range from 0.9 to 1.15 mm;
iv) $d_c$ is in the range from 19.05 to 23 mm, preferably in the range from 21 to 22.5 mm and even more preferably in the range from 21.8 to 22.2 mm;
v) $[100\times(d_h^3\times r_i)/(d_w\times d_c^2)]+(4.4\ mm^2/d_c)$ is in the range from 0.40 to 10 mm, preferably in the range from 0.55 to 2.50 mm, more preferably in the range from 0.9 to 1.8 mm and even more preferably in the range from 1.3 to 1.7 mm;
vi) $d_{bottom}$ is in the range from 13.85 to 23.8 mm, preferably in the range from 21 to 23 mm and even more preferably in the range from 21.5 to 22.5 mm.

According to another embodiment of the glass container according to the present invention the glass container is a vial with an overflow capacity of larger than 12.5 ml up to maximal 16.25 ml, preferably a vial with a size designation "10R" according to DIN EN ISO 8362-1:2016-06, wherein it is furthermore preferred that at least one, preferably all of the following conditions i) to vi) is/are fulfilled:

i) $d_h$ is in the range from 0.5 to 3 mm, preferably in the range from 1.05 to 2.50 mm and even more preferably in the range from 1.3 to 1.8 mm;
ii) ri is in the range from 0.6 to 8 mm, preferably in the range from 1.1 to 4 mm and even more preferably in the range from 1.4 to 2.6 mm;
iii) $d_w$ is preferably in the range from 0.9 to 1.15 mm;
iv) $d_c$ is in the range from 23.05 to 27 mm, preferably in the range from 23.5 to 25 mm and even more preferably in the range from 23.8 to 24.2 mm;
v) $[100\times(d_h^3\times r_i)/(d_w\times d_c^2)]+(4.4\ mm^2/d_c)$ is in the range from 0.35 to 10 mm, preferably in the range from 0.55 to 2.50 mm, more preferably in the range from 0.9 to 1.8 mm and even more preferably in the range from 1.3 to 1.7 mm;
vi) $d_{bottom}$ is in the range from 15.38 to 23.8 mm, preferably in the range from 21 to 23 mm and even more preferably in the range from 21.5 to 22.5 mm.

According to another embodiment of the glass container according to the present invention the glass container is a vial with an overflow capacity of larger than 16.25 ml up to maximal 22.5 ml, preferably a vial with a size designation "15R" according to DIN EN ISO 8362-1:2016-06, wherein it is furthermore preferred that at least one, preferably all of the following conditions i) to vi) is/are fulfilled:

i) $d_h$ is in the range from 0.5 to 3 mm, preferably in the range from 1.05 to 2.50 mm and even more preferably in the range from 1.3 to 1.8 mm;
ii) $r_i$ is in the range from 0.6 to 8 mm, preferably in the range from 1.1 to 4 mm and even more preferably in the range from 1.4 to 2.6 mm;
iii) $d_w$ is in the range from 0.4 to 2 mm, preferably in the range from 0.9 to 1.15 mm;
iv) $d_c$ is in the range from 23.05 to 27 mm, preferably in the range from 23.5 to 25 mm and even more preferably in the range from 23.8 to 24.2 mm;
v) $[100\times(d_h^3\times r_i)/(d_w\times d_c^2)]+(4.4\ mm^2/d_c)$ is in the range from 0.35 to 10 mm, preferably in the range from 0.55 to 2.50 mm, more preferably in the range from 0.9 to 1.8 mm and even more preferably in the range from 1.3 to 1.7 mm;
vi) $d_{bottom}$ is in the range from 15.38 to 23.8 mm, preferably in the range from 21 to 23 mm and even more preferably in the range from 21.5 to 22.5 mm.

According to another embodiment of the glass container according to the present invention the glass container is a vial with an overflow capacity of larger than 22.5 ml up to maximal 29.25 ml, preferably a vial with a size designation "20R" according to DIN EN ISO 8362-1:2016-06, wherein it is furthermore preferred that at least one, preferably all of the following conditions i) to vi) is/are fulfilled:

i) $d_h$ is in the range from 0.6 to 3.6 mm, preferably in the range from 1.26 to 3 mm and even more preferably in the range from 1.56 to 2.16 mm;
ii) $r_i$ is in the range from 0.78 to 10.4 mm, preferably in the range from 1.43 to 5.2 mm and even more preferably in the range from 1.82 to 3.38 mm;
iii) $d_w$ is in the range from 0.5 to 2.5 mm, preferably in the range from 0.9 to 1.6 mm and even more preferably in the range from 1.15 to 1.25 mm;
iv) $d_c$ is in the range from 27.05 to 35 mm, preferably in the range from 29 to 31 mm and even more preferably in the range from 29.75 to 30.25 mm;
v) $[100\times(d_h^3\times r_i)/(d_w\times d_c^2)]+(4.4\ mm^2/d_c)$ is in the range from 0.35 to 10 mm, preferably in the range from 0.55 to 2.50 mm, more preferably in the range from 0.9 to 1.8 mm and even more preferably in the range from 1.3 to 1.7 mm;
vi) $d_{bottom}$ is in the range from 19.23 to 29.8 mm, preferably in the range from 25 to 29 mm and even more preferably in the range from 27.5 to 28.4 mm.

According to another embodiment of the glass container according to the present invention the glass container is a vial with an overflow capacity of larger than 29.25 ml up to maximal 35 ml, preferably a vial with a size designation "25R" according to DIN EN ISO 8362-1:2016-06, wherein it is furthermore preferred that at least one, preferably all of the following conditions i) to vi) is/are fulfilled:

i) $d_h$ is in the range from 0.6 to 3.6 mm, preferably in the range from 1.26 to 3 mm and even more preferably in the range from 1.56 to 2.16 mm;
ii) $r_i$ is in the range from 0.78 to 10.4 mm, preferably in the range from 1.43 to 5.2 mm and even more preferably in the range from 1.82 to 3.38 mm;
iii) $d_w$ is in the range from 0.5 to 2.5 mm, preferably in the range from 0.9 to 1.6 mm and even more preferably in the range from 1.15 to 1.25 mm;
iv) $d_c$ is in the range from 27.05 to 35 mm, preferably in the range from 29 to 31 mm and even more preferably in the range from 29.75 to 30.25 mm;
v) $[100\times(d_h^3\times r_i)/(d_w\times d_c^2)]+(4.4\ mm^2/d_c)$ is in the range from 0.35 to 10 mm, preferably in the range from 0.55 to 2.50 mm, more preferably in the range from 0.9 to 1.8 mm and even more preferably in the range from 1.3 to 1.7 mm;
vi) $d_{bottom}$ is in the range from 19.23 to 29.8 mm, preferably in the range from 25 to 29 mm and even more preferably in the range from 27.5 to 28.4 mm.

According to another embodiment of the glass container according to the present invention the glass container is a vial with an overflow capacity of larger than 35 ml up to maximal 49.75 ml, preferably a vial with a size designation "30R" according to DIN EN ISO 8362-1:2016-06, wherein it is furthermore preferred that at least one, preferably all of the following conditions i) to vi) is/are fulfilled:

i) $d_h$ is in the range from 0.6 to 3.6 mm, preferably in the range from 1.26 to 3 mm and even more preferably in the range from 1.56 to 2.16 mm;
ii) $r_i$ is in the range from 0.78 to 10.4 mm, preferably in the range from 1.43 to 5.2 mm and even more preferably in the range from 1.82 to 3.38 mm;
iii) $d_w$ is in the range from 0.5 to 2.5 mm, preferably in the range from 0.9 to 1.6 mm and even more preferably in the range from 1.15 to 1.25 mm;
iv) $d_c$ is in the range from 27.05 to 35 mm, preferably in the range from 29 to 31 mm and even more preferably in the range from 29.75 to 30.25 mm;
v) $[100 \times (d_h^3 \times r_i)/(d_w \times d_c^2)] + (4.4 \text{ mm}^2/d_c)$ is in the range from 0.35 to 10 mm, preferably in the range from 0.55 to 2.50 mm, more preferably in the range from 0.9 to 1.8 mm and even more preferably in the range from 1.3 to 1.7 mm;
vi) $d_{bottom}$ is in the range from 19.23 to 29.8 mm, preferably in the range from 25 to 29 mm and even more preferably in the range from 27.5 to 28.4 mm.

According to another embodiment of the glass container according to the present invention the glass container is a vial with an overflow capacity of larger than 49.75 ml up to maximal 92.5 ml, preferably a vial with a size designation "50R" according to DIN EN ISO 8362-1:2016-06, wherein it is furthermore preferred that at least one, preferably all of the following conditions i) to vi) is/are fulfilled:
i) $d_h$ is in the range from 0.75 to 4.5 mm, preferably in the range from 1.58 to 3.75 mm and even more preferably in the range from 1.95 to 2.7 mm;
ii) $r_i$ is in the range from 1.5 to 20 mm, preferably in the range from 2.75 to 10 mm and even more preferably in the range from 3.5 to 6.5 mm;
iii) $d_w$ is in the range from 0.4 to 2.5 mm, preferably in the range from 1.3 to 1.8 mm and even more preferably in the range from 1.45 to 1.55 mm;
iv) $d_c$ is in the range from 35.05 to 43.5 mm, preferably in the range from 39 to 41 mm and even more preferably in the range from 39.6 to 40.4 mm;
v) $[100 \times (d_h^3 \times r_i)/(d_w \times d_c^2)] + 4.4 \text{ mm}^2 d_c)$ is in the range from 0.45 to 10 mm, preferably in the range from 0.55 to 2.50 mm, more preferably in the range from 0.9 to 1.8 mm and even more preferably in the range from 1.3 to 1.7 mm;
vi) $d_{bottom}$ is in the range from 24.62 to 39.8 mm, preferably in the range from 35 to 38 mm and even more preferably in the range from 36.8 to 37.6 mm.

According to another embodiment of the glass container according to the present invention the glass container is a vial with an overflow capacity of larger than 92.5 ml up to maximal 150 ml, preferably a vial with a size designation "100R" according to DIN EN ISO 8362-1:2016-06, wherein it is furthermore preferred that at least one, preferably all of the following conditions i) to vi) is/are fulfilled:
i) $d_h$ is in the range from 0.85 to 5.1 mm, preferably in the range from 1.79 to 4.25 mm and even more preferably in the range from 2.21 to 3.06 mm;
ii) $r_i$ is in the range from 1.38 to 18.4 mm, preferably in the range from 2.53 to 9.2 mm and even more preferably in the range from 3.22 to 5.98 mm;
iii) $d_w$ is in the range from 0.4 to 2.5 mm, preferably in the range from 1.3 to 1.8 mm and even more preferably in the range from 1.65 to 1.75 mm;
iv) $d_c$ is in the range from 43.55 to 60 mm, preferably in the range from 46 to 48 mm and even more preferably in the range from 46.4 to 47.6 mm;
v) $[100 \times (d_h^3 \times r_i)/(d_w \times d_c^2)] + (4.4 \text{ mm}^2/d_c)$ is in the range from 0.35 to 10 mm, preferably in the range from 0.55 to 2.50 mm, more preferably in the range from 0.9 to 1.8 mm and even more preferably in the range from 1.3 to 1.7 mm;
vi) $d_{bottom}$ is in the range from 30 to 46.8 mm, preferably in the range from 42 to 45 mm and even more preferably in the range from 43.6 to 44.4 mm.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 3A shows a schematic depiction of the glass bottom;

FIG. 3B shows a top view of the glass bottom;

FIG. 3C shows a cross-sectional view of the glass bottom;

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
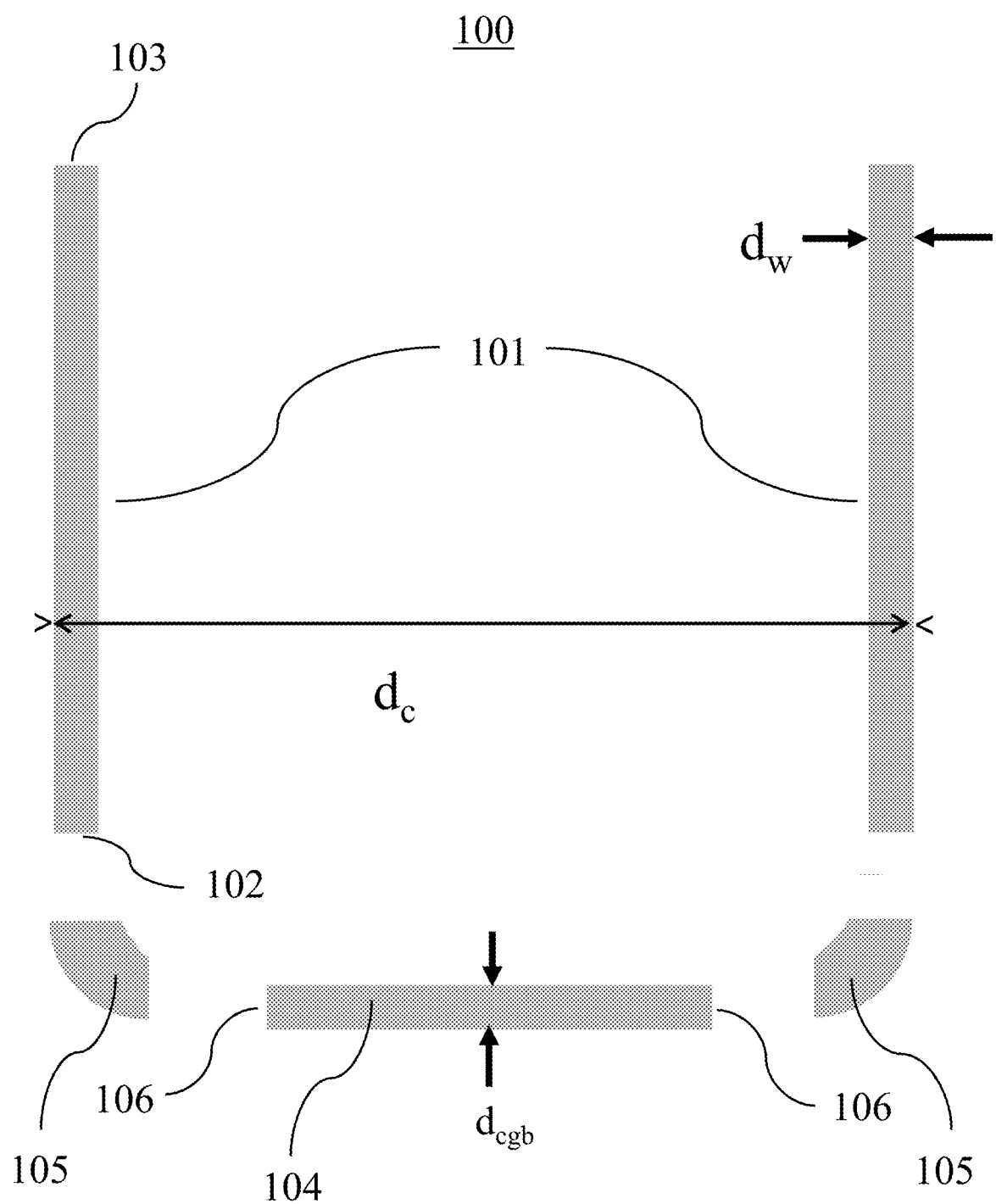
FIG. 1 shows a cross-sectional view of a glass container according to the invention, wherein for the purpose of an improved illustration the parts of the glass container (i.e. glass tube, glass bottom and curved glass heel) have been separated from each other.

FIG. 1 shows a cross-sectional view of a glass container 100 according to the invention. For the purpose of an improved illustration the individual parts of the glass container (i.e. glass tube 101, glass bottom 104 and curved glass heel 105) have been separated from each other. However, as the glass container 100 according to the invention is preferably obtained by a process in which a mother tube (which forms glass tube 101), while rotating around its major axis, is heated to its softening point with flames, in which the heated glass is pulled along its major axis for stretching and creating a container closure and in which the container closure has been shaped to form a glass bottom 104 and a curved glass heel 105, these parts are integrally connected in the glass container 100 according to the present invention. As shown in FIG. 1, the glass tube 101 may be a first end 102 and a second end 103. The glass bottom 104 comprises an outer region 106 that in the glass container 100 is connected to the curved glass heel 105. The glass bottom 104 may have a thickness in the center $d_{cgb}$, whereas the glass tube 101 may have a wall thickness $d_w$. The outer diameter of glass tube 101 is $d_c$.

Figure 2:
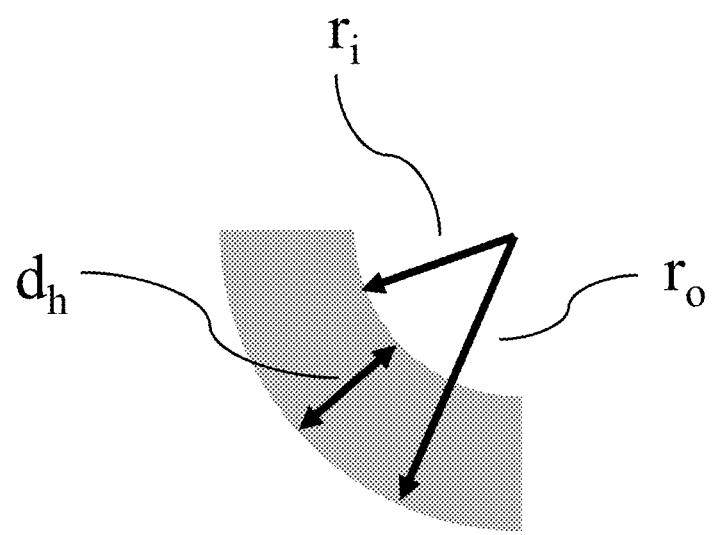
FIG. 2 shows a cross-sectional view of the curved glass heel of a prior art glass container.

FIG. 2 shows a cross-sectional view of a curved glass heel 105 and illustrates the characterization of such a curved heel 105 by way of the inner radius $r_i$, the outer radius $r_o$ and the thickness of the glass $d_h$ in the curved glass heel 105. In an ordinary glass container of the prior art as shown in FIG. 2, in which the glass bottom 104 has been prepared by simply bending over the heat softened areas of a mother tube by way of a process as described above and in which no particular measures have been taken to somehow shape the form the curved glass heel 105, the circle defined by inner radius $r_i$ and the circle defined by outer radius $r_o$ are located concentric to one another as shown in FIG. 2. Under these circumstances, condition $r_0 = r_i + d_h$ is fulfilled. However, according to the present invention the resistance of a glass container 100 towards axial loads can be improved if a curved glass heel 105 is formed that deviates from the structure as shown in FIG. 2 (see, for example, the structure of the curved glass heel 105 in FIG. 5).

FIGS. 3A-3C shows a glass bottom 104 from different perspectives, wherein the glass bottom 104 is a circular glass bottom. FIG. 3A shows a schematic depiction of the glass bottom 104 and the outer area 106 of the glass bottom that in the glass container 100 according to the invention merges into the curved glass heel 105 (which then merges into the first end 102 of the glass tube 101). FIG. 3B shows a top view of the glass bottom 104 with the center 107. FIG. 3C shows a cross-sectional view of the circular glass bottom 104. As shown in FIG. 3C, the thickness of the glass in the glass bottom 104 can vary with the area from the center 107 towards the outer region 106. In the glass bottom 104 shown in FIG. 3C the thickness reaches its lowest point at the center 107 of the glass bottom 104. As a consequence of the above described nature of the process of forming a glass bottom 104 and a curved glass heel 105 from a mother tube 101 the exterior surface of the glass bottom is not necessarily flat, but often has a concave indentation 108 as shown in FIG. 3C.

Figure 4:
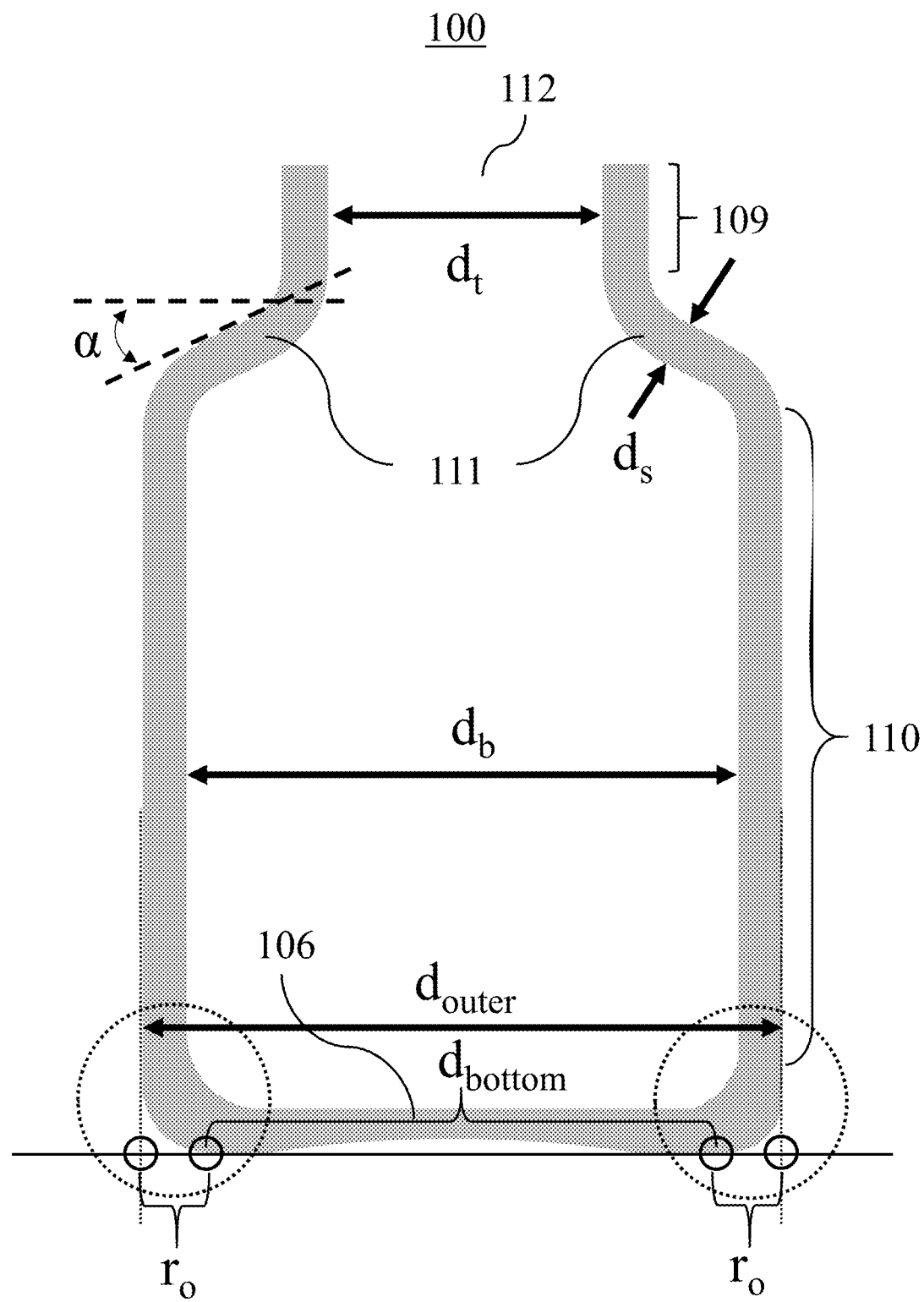
FIG. 4 shows a cross-sectional view of a further glass container according to the invention.

FIG. 4 shows a cross sectional view of a further glass container 100 according to the invention. The glass container 100 comprises a top region 109 in which the inner diameter of the glass tube 101 is $d_t$ and a body region 110 in which the inner diameter of the glass tube 101 is $d_b$ and in which the outer diameter is $d_c$, wherein $d_b > d_c$. The glass container 100 further comprises a shoulder 111 that connects the body region 110 with the top region 109, wherein shoulder 111 may have a shoulder angle α. At the top of the non-closed glass container 100 is an opening 112. The dotted circles at the bottom show the curved glass heel 105 of the glass container 100 according to the invention. The section covered by the dotted circles is shown in an enlarged view in FIG. 5. The glass container 100 comprises a circular bottom 106 that may have a bottom diameter $d_{bottom}$, wherein $d_{bottom} = d_{outer} - 2 \times r_o$ ($d_{outer}$ corresponds to the outer diameter of the glass tube 101 measured at the first end 102 of the glass tube 101 and ro is the outer radius of the curved glass heel 105 measured by way of the approach shown in FIG. 9A). The shoulder angle α may be in the range from 10 to 70°, preferably in the range from 25 to 60°, more preferably in the range from 33 to 55°, even more preferably in the range from 37 to 50° and most preferably in the range from 38° to 45°. The container part from the glass bottom 104 up to the shoulder 111 may be rotation-symmetric around the longitudinal axis that goes perpendicular through the center of the glass bottom 104.

Figure 5:
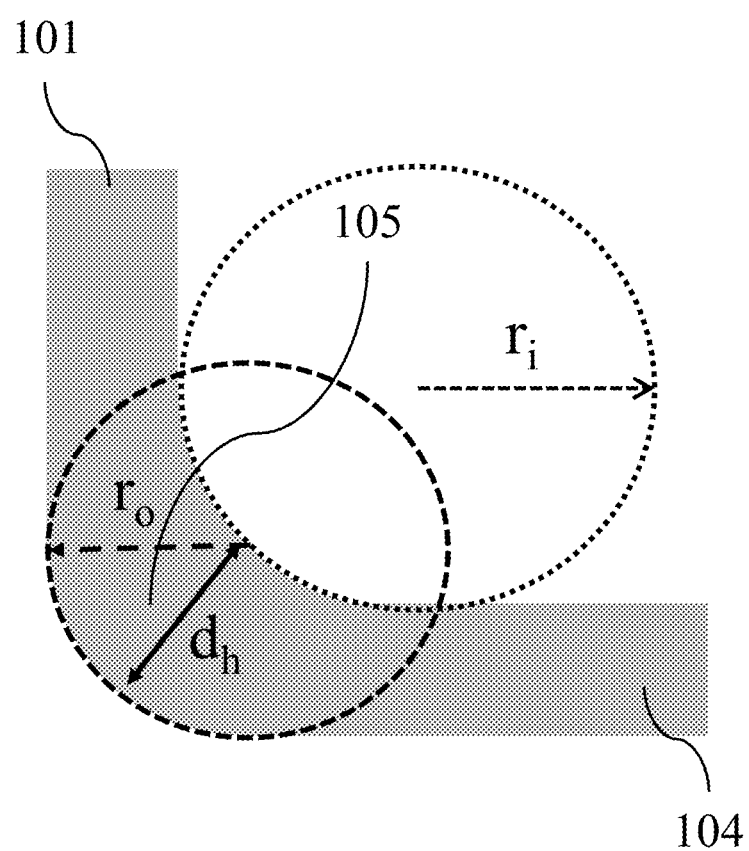
FIG. 5 shows an enlarged cross-sectional view of the curved glass heel in the glass container according to the invention.

FIG. 5 shows an enlarged view of the curved glass heel 105 in the glass container 100 according to the invention in which the inner and outer contour of the glass heel 105 are substantially circular arc-shaped. As can be seen, the structure of the curved glass heel 105 deviates from the structure of the curved glass heel in prior art containers that are shown in FIG. 2. The thickness of the glass dh in the area of the curved glass heel 105 has been increased and the outer radius $r_o$ has been reduced to ensure that a certain minimum value for the term $d_h^3/(r_o \times d_w)$ is reached. Furthermore, the inner radius $r_i$ also has been increased.

Figure 6:
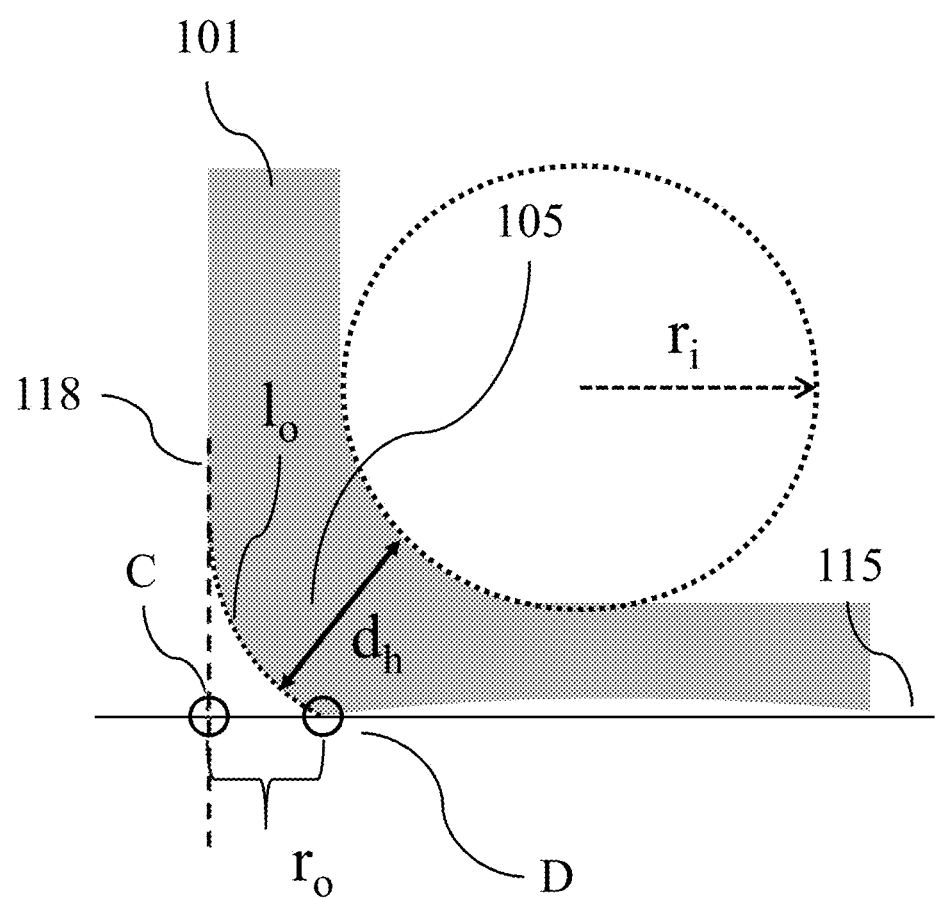
FIG. 6 shows an enlarged cross-sectional view of a further embodiment of the curved glass heel in the glass container according to the invention.

FIG. 6 shows an enlarged view of a further curved glass heel 105 in a glass container 100 according to the invention in which the inner and outer contour of the glass heel 105 are substantially arc-shaped, but in which—contrary to the curved glass heel shown in FIG. 5—the length of the circular arc at the outer surface of the curved glass heel is smaller than $2 \times \pi \times r_o/4$. In this case $r_o$ does not correspond to the outer radius of the curved glass heel, but to width of the glass overhang in the area of the curved glass heel that is defined by the distance between points "C" and "D" (for the determination of $r_o$ see again FIG. 9A).

Figure 7A:
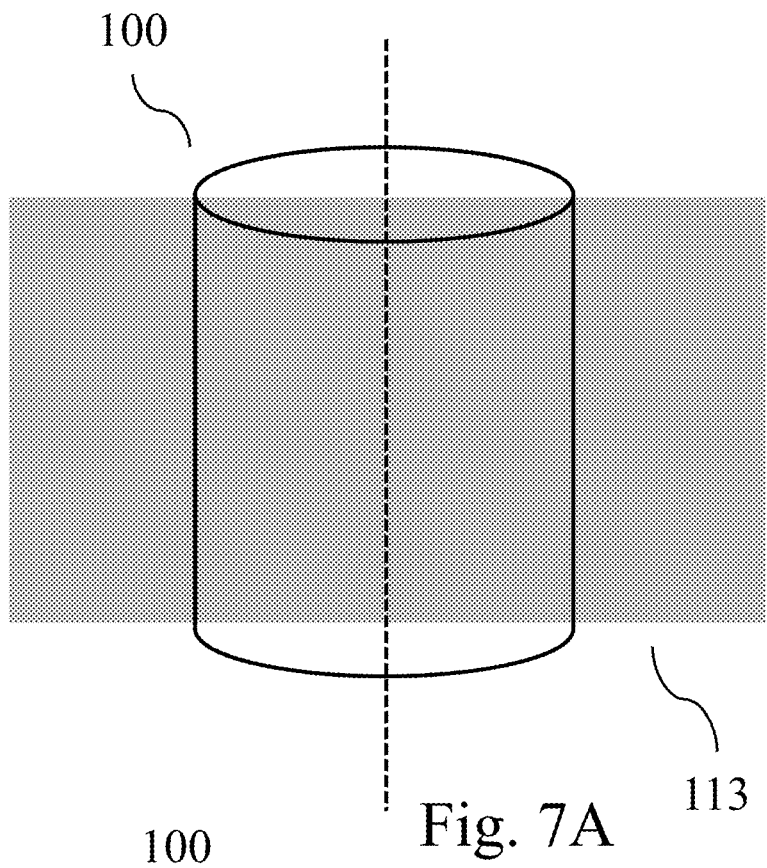
FIG. 7A shows in a side view the localization of plane that is used to determine $r_o$, $r_i$ and $d_h$ by way of the approaches that are shown in FIGS. 8A, 8B, 9A and 9B.
Figure 7B:
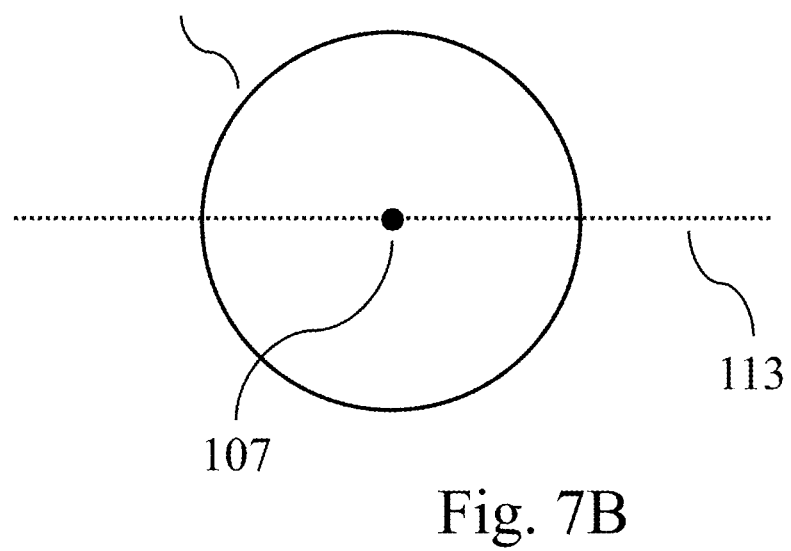
FIG. 7B shows in a top view the localization of plane that is used to determine $r_o$, L and $d_h$ by way of the approaches that are shown in FIGS. 8A, 8B, 9A and 9B.

FIGS. 7A and 7B show in a side view and in a top view the localization of plane 113 in the glass container 100 that is used to determined $r_o$, $r_i$ and $d_h$ by way of the approaches that are shown in FIGS. 8A, 8B, 9A and 9B. Plane 113 corresponds to the plane that is centrically located in the glass container and that comprises the longitudinal axis of the glass container (indicated by the dashed line in FIG. 7A), i.e. the axis that goes perpendicular through the center of the bottom 107 (see FIG. 7B).

Figure 8A:
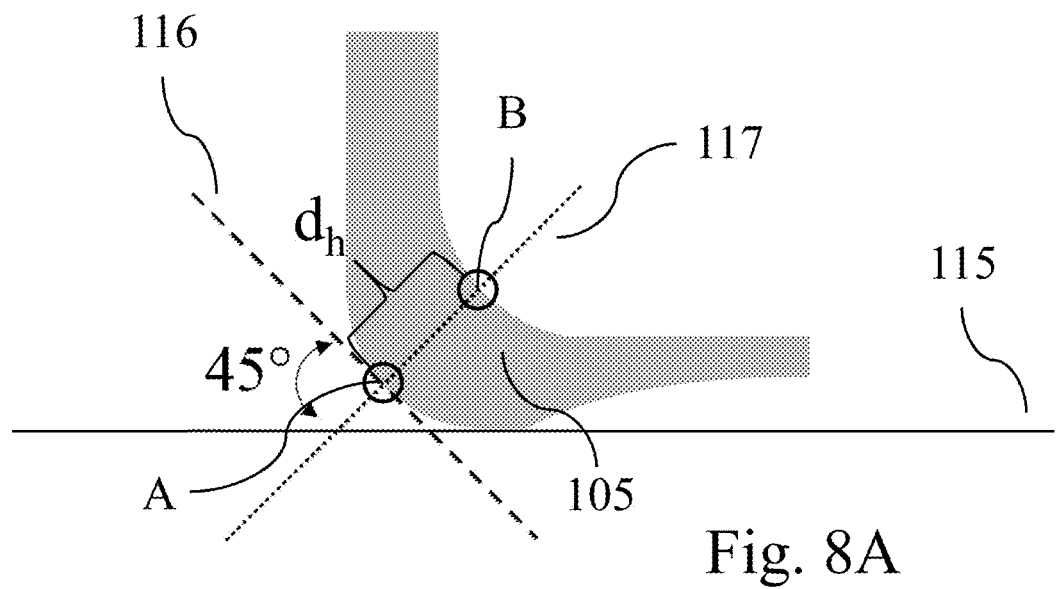
FIG. 8A illustrates the determination of dh in a curved glass heel.

FIG. 8A illustrates the determination of $d_h$ in a curved glass heel 105 in plane 113. For the determination of $d_h$ a tangent 116 that confines an angle of 45° with the ground-level bearing surface 115 is placed at the exterior surface of the curved glass heel 105. The point of the exterior surface of the curved glass heel 105 that comes into contact with the 45-tangent 116 is designated as "A" (see the lower circle in FIG. 8A). Next, a straight line 117 orthogonal to 45°-tangent 116 is guided through point "A". The position at which this straight orthogonal line 117 breaks through the interior side of the curved glass heel 105 is designated as "B" (see the upper circle FIG. 8A). $d_h$ corresponds to the distance between points "A" and "B".

Figure 8B:
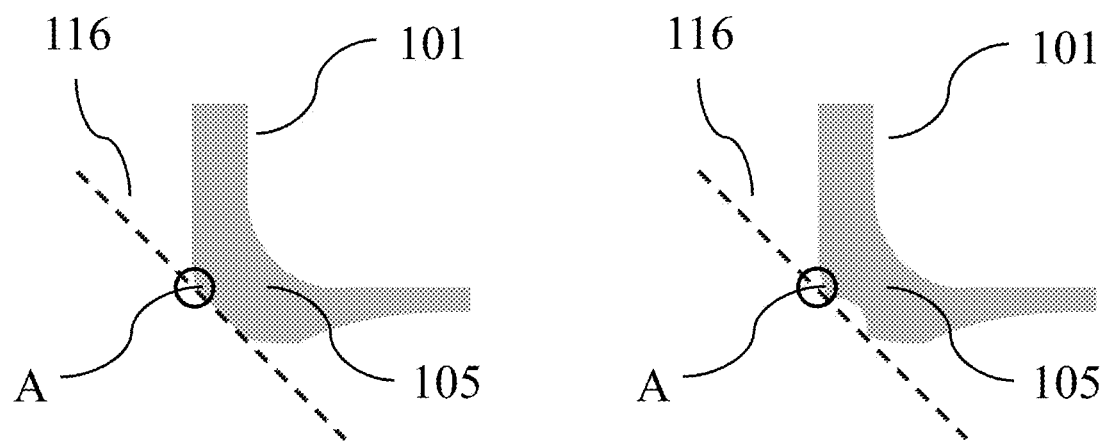
FIG. 8B shows different shapes of the exterior surface of a curved glass heel.

FIG. 8B shows curved glass heels 105 having a shape such that there are more than only one point of exterior surface of the curved glass heel 105 that comes into contact with the 45-tangent 116. In such a case point "A" corresponds to the point that is nearest to the outer surface of glass tube 101.

Figure 9A:
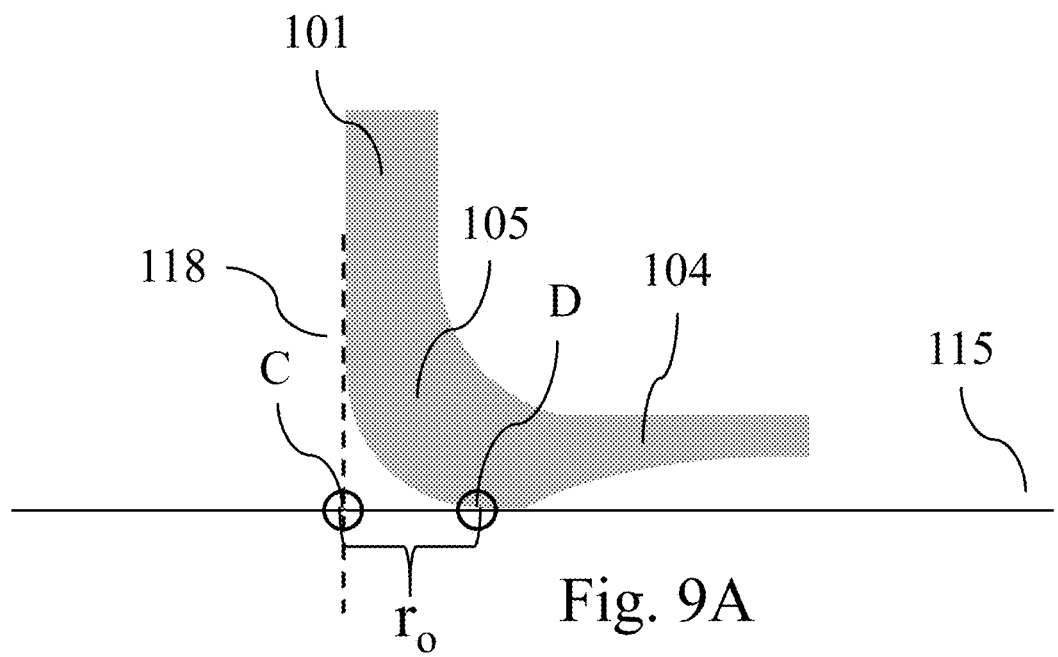
FIG. 9A illustrates the determination of $r_o$ in a curved glass heel.

FIG. 9A illustrates the determination of $r_o$ in a curved glass heel 105 in plane 113. For the determination of $r_o$ the intersection point of a first straight line 118 that forms an elongation of the exterior side of the glass tube 101 and the ground-level bearing surface 115 is determined. This intersection point is designated as "C" (see the left circle in FIG. 9A). Next, the point of the exterior surface of the glass container 100 that contacts the ground-level bearing surface 115 and that is closest to point "C" is determined. This intersection point is designated as "D" (see the right circle in FIG. 9A). $r_o$ corresponds to the distance between points "C" and "D".

Figure 9B:
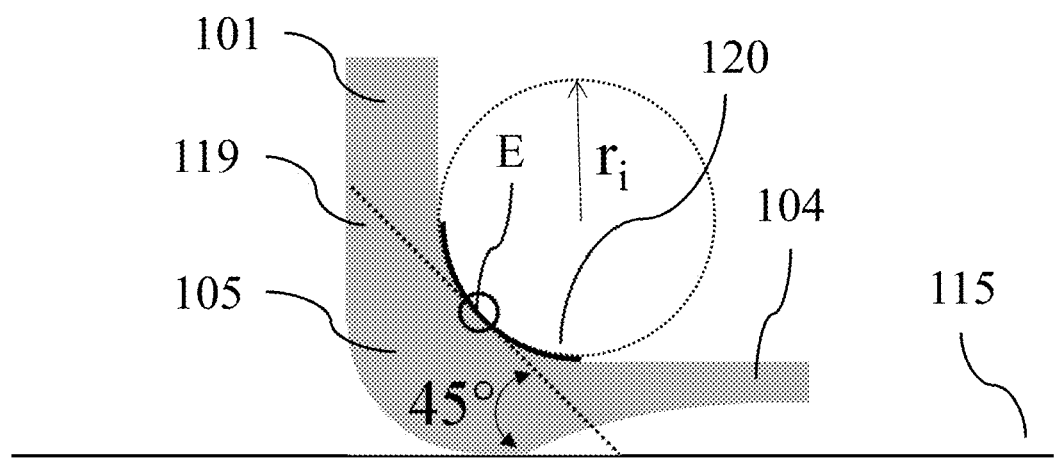
FIG. 9B illustrates the determination of $r_i$ in a curved glass heel.

FIG. 9B illustrates the determination of $r_i$ in a curved glass heel 105 in plane 113. For the determination of $r_i$ a tangent 119 that confines and angle of 45° with the ground-level bearing surface 115 is placed at the interior surface of the curved glass heel 105. The point of the interior surface of the curved glass heel 105 that comes into contact with the 45-tangent 119 is designated as "E" (see the small circle in FIG. 9B). Next, the largest quarter circle 120 is determined that can be properly positioned on the inner contour of the curved glass heel 105, that comprises point "E" in the middle of the quarter circle and the ends of which do not extend into the mass of glass. $r_i$ corresponds to the radius of the largest quarter circle 120.

If there are more than only one point of interior surface of the curved glass heel 105 that comes into contact with the 45°-tangent 119, point "E" corresponds to the geometric center between points "P1" and "P2", wherein point "P1" is the point on the 45°-tangent 119 that comes into contact with the interior surface of the curved glass and that is located nearest to the glass tube 101 and point "P2" is the point on the 45°-tangent 119 that comes into contact with the interior surface of the curved glass heel 105 and that is located nearest to the glass bottom 104.

Figure 10:
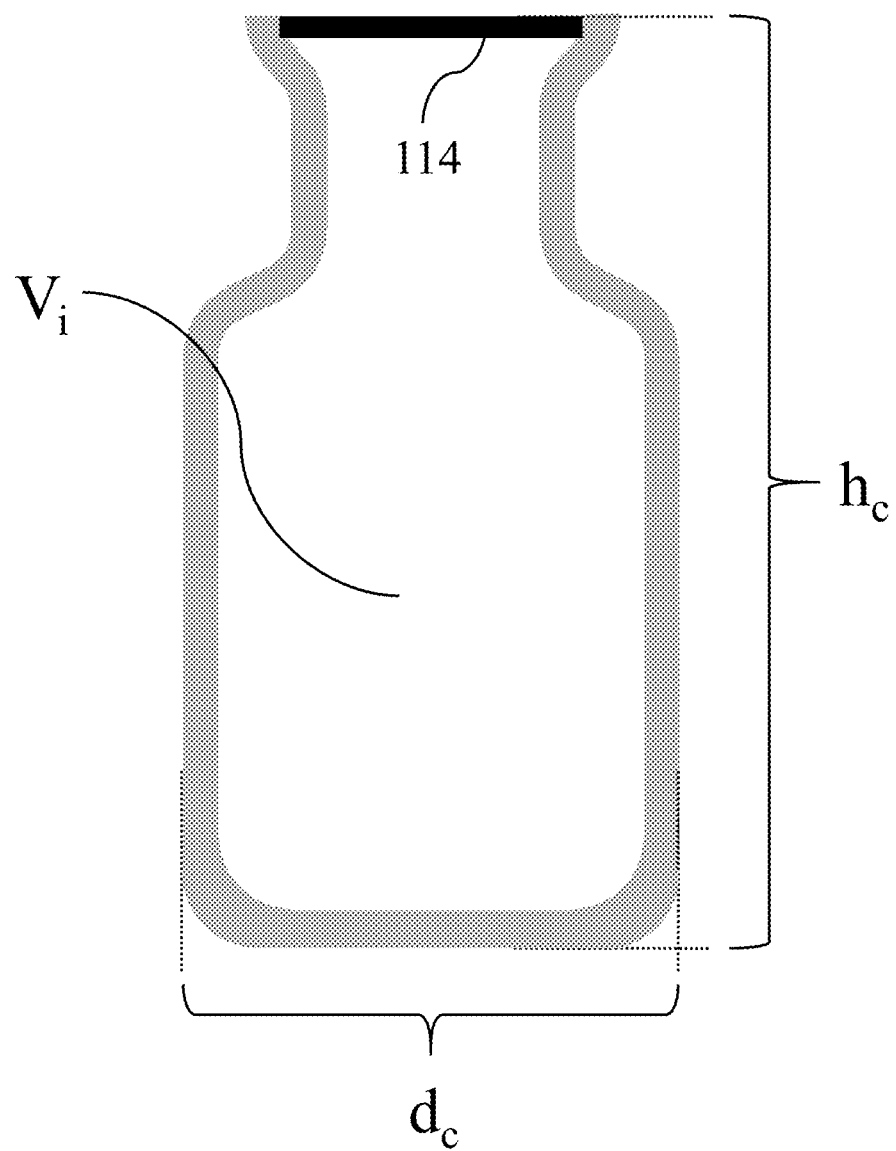
FIG. 10 shows a closed glass container according to the invention.

FIG. 10 shows a closed glass container 121 according to the invention. In addition to the glass container 100 shown in FIG. 4 the closed glass container 121 further comprises a closure 114 that closes opening 112, wherein the closure 114 preferably is a lid, which is preferably joined to the glass container 100. The joining preferably comprises creating a form-fit of the glass container 100, preferably the flange of the glass container 100, with the closure 114. The form-fit is preferably created via a crimping step. As also shown in FIG. 9, the glass container 100 according to the invention may have an interior volume $V_i$, a height $h_c$ (measured from the lowest point at the bottom of the glass container 100 to the highest point of the glass at the top of the glass container 100) and an outer diameter $d_c$ of the container measured at the bottom end of the cylindrical part of the glass tube 101. The outer diameter dthus represents the outer diameter of the glass tube 101 in the preferred embodiment of the container according to the present invention.

It should be appreciated that the glass container 100 may have any desired configuration wherein $d_w$ is in the range from 0.4 to 3.0 mm, $d_h$ is in the range from 1.0 to 5.0 mm, $r_o$ is in the range from 0.5 to 4.0 mm, $r_i$ is in the range from 0.6 to 4.0 mm, $r_i > 0.7$ mm or $r_i > 1.2$ mm, $d_c$ is in the range from 13 to 65 mm, $r_i + d_h - r_o > 0$ mm such as $r_i + r_o > 0.75$ mm, $r_o < 3.0 \times d_w$ such as $r_o < 1.0 \times d_w$, $d_h > 1.05 \times d_w$ such as $d_h > 1.6 \times d_w$, $d_h - d_{cgb} > 0.5$ mm such as $d_h - d_{cgb} > 3.0$ mm, and/or $d_{cgb}$ is in the range from 0.6 to 2.5 mm such as in the range from 1.0 to 2.0 mm. The glass container 100 may also have any desired configuration wherein $d_t$ may be in the range from 5 to 20 mm, and/or $d_b$ may be in the range from 10 to 60 mm. The height $h_c$ of the glass container 100 may be in the range from 15 to 100 mm. Also, the glass container 100 may have any desired configuration wherein: $[100 \times (d_h^3 \times r_i)/(d_w \times d_c^2)] + (4.4 \text{ mm}^2/d_c) < 20$ mm, preferably $[100 \times (d_h^3 \times r_i)/(d_w \times d_c^2)] + (4.4 \text{ mm}^2/d_c) < 10$ mm, and more preferably $[100 \times (d_h^3 \times r_i)/(d_w \times d_c^2)] + (4.4 \text{ mm}^2/d_c) < 5$ m.

Furthermore, it should be appreciated that the glass container 100 may be a tubular glass container prepared from prefabricated glass tubing by shaping and separation. The glass container 100 may be thermally tempered and/or chemically tempered.

Additionally, it should be appreciated that in the configuration wherein the glass container 100 includes a cylindrical glass tube and wherein the glass bottom is a circular glass bottom, the circular glass bottom may have a thickness that varies within the area from the center of the circular glass bottom to the outer area of the circular glass bottom, wherein the minimum glass thickness of the circular glass bottom is $d_{b,min}$ and wherein $d_h/d_{b,min} < 3.0$. The thickness of the circular glass bottom $d_{b,min}$ may be in the range from 0.6 to 3.0 mm. A contour of the cross section of the circular glass bottom on the side directed to the interior side of the glass container 100 over whole diameter of the circular glass bottom may not have more than two inflection points. Furthermore, the circular bottom may have a bottom diameter $d_{bottom}$, wherein $d_{bottom} d_{outer} - 2 \times r_o$, and wherein $d_{outer}$ corresponds to the outer diameter of the glass tube measured at the first end of the glass tube, and $d_{bottom}$ may be in the range from 10 to 50 mm.

It should also be appreciated that the outer surface of the curved glass heel has the form of a circular arc $l_o$ and wherein $l_o$ has a length of $2 \times \pi \times r_o/4$. The outer surface of the curved glass heel has the form of a circular arc $l_o$ and wherein $l_o$ has a length in the range from) $(50°/360°) \times 2\pi \times r_o$ to $(80°/360°) \times 2\pi \times r_o$, such as in the range from)$(60°/360°) \times 2\pi \times r_o$ to $(80°/360°) \times 2\pi \times r_o$.

It should be appreciated that the glass container 100 may be designed such that $d_w$ may be in the range from 0.5 to 3.0 mm, $d_h$ may be in the range from 0.5 to 5.0 mm, $r_o$ may in the range from 0.5 to 4.0 mm, $r_i$ may in the range from 0.6 to 4.0 mm, $r_i + d_h - r_o > 0$ mm, $r_o < 1.4 \times d_w$, $d_h > 1.05 \times d_w$, $d_h - d_{cgb} > 0.5$ mm, $d_{cgb}$ may be in the range from 0.6 to 2.5 mm, $d_h^3/(r_o \times d_w) \leq 7.0$ mm, $d_t$ may be in the range from 5 to 20 mm, and/or db may be in the range from 10 to 60 mm. The height $h_c$ of the glass container 100 may be in the range from 15 to 100 mm.

In another embodiment of the glass container 100, which includes the shoulder 111, the shoulder 111 may have a thickness $d_s$, and wherein $d_s$ is in the range from 1.0 to 2.5 mm. It should be appreciated that throughout the body region the wall thickness $d_w$ of the glass tube is in a range from ±0.2 mm, in each case based on a mean value of this wall thickness in the body region. The glass container 100 may have a mass of glass $m_g$ and an interior volume $V_i$ and wherein the following condition is fulfilled: $m_g/V_i^{0.75} < 2.0$, preferably $m_g/V_i^{0.75} < 1.75$, wherein he interior volume $V_i$ in a range from 2 to 150 ml, preferably from 3 to 100 ml, more preferably from 3 to 50 ml, even more preferably from 3 to 15 ml, and most preferably from 3 to 7 ml. The interior volume $V_i$ of the glass container 100 comprises a pharmaceutical composition.

In another embodiment of the glass container 100, at least one of the properties of the glass container 100 may be selected from the group consisting of $r_o$ ($r_2$), $d_w$ ($S_1$), $d_c$ ($d_1$), $d_{b,min}$ ($s_2$, min) and $h_c$($h_1$) is not within the requirements defined in DIN EN ISO 8362-1:2016-06 (the corresponding designation of properties $r_o$, $d_w$, $d_c$, $d_b$, $d_{b,min}$ and $h_c$ in DIN EN ISO 8362-1:2016-06 is indicated in the parenthesis).

In another embodiment of the glass container 100, the glass container 100 may be in the form of a packaging container for a medical or a pharmaceutical packaging good or both. A desired pharmaceutical packaging good is a pharmaceutical composition. Preferably, the glass container 100 is suitable for packaging parenteralia in accordance with section 3.2.1 of the European Pharmacopoeia, 7th edition from 2011. For instance, the glass container may be in the form of a vial.

In another embodiment of the glass container 100, the glass of the glass container 100 may be of a type selected from the group consisting of a borosilicate glass, an aluminosilicate glass, soda lime glass and fused silica. "Soda lime glass" according to the invention is an alkaline/alkaline earth/silicate glass according to table 1 of ISO 12775 ($^{st}$ edition 1997-10-15).

In another embodiment of the glass container 100, the glass container 100 may include a coating that at least partially superimposes the exterior surface, the interior surface or the exterior and the interior surface of the glass tube. The coating comprises a silicone, a silane or a mixture thereof, wherein the silicone or the silane can be crosslinked or non-crosslinked. Suitable silanes and silicones for treating the surface of glass containers are, for examples, disclosed in US 2011/0006028 A1, U.S. Pat. No. 4,420,578 or in WO 2014/105350 A3. The coating may preferably comprise a coupling agent layer positioned on the exterior surface (i.e. the surface opposite to the interior surface that directed to the interior volume $V_i$ of the glass container) of the glass tube, the coupling agent layer comprising a coupling agent; and a polymer layer positioned over the coupling agent layer, the polymer layer comprising a polymer chemical composition. Preferably, the coating is a coating as described in US 2013/171456 A1. The coating may further comprise an interface layer positioned between the coupling agent layer and the polymer layer; and the interface layer comprises one or more chemical compositions of the polymer layer bound with one or more of the chemical compositions of the coupling agent layer. The coupling agent may comprise at least one of: a first silane chemical composition, a hydrolysate thereof, or an oligomer thereof; and a chemical composition formed from the oligomerization of at least the first silane chemical composition and a second silane chemical composition, wherein the first silane chemical composition and the second silane chemical composition are different chemical compositions. The first silane chemical composition is an aromatic silane chemical composition. The coupling agent may comprise a silsesquioxane chemical composition comprising an aromatic moiety and an amine moiety. The coupling agent may also comprise at least one of: a mixture of a first silane chemical composition and a second silane chemical composition; and a chemical composition formed from the oligomerization of at least the first silane chemical composition and the second silane chemical composition, wherein the first silane chemical composition and the second silane chemical composition are different chemical compositions. The first silane chemical composition is an aromatic silane chemical composition. The polymer chemical composition is a polyimide chemical composition.

Figure 11A:
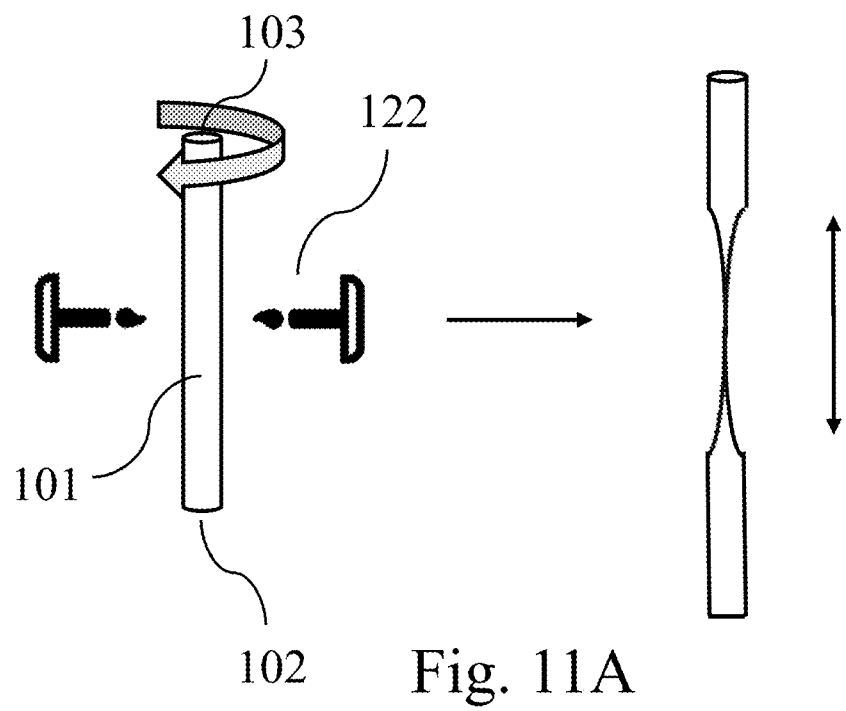
FIG. 11A illustrates steps I), II) and III) of a process according to the invention for the preparation of a glass container.
Figure 11B:
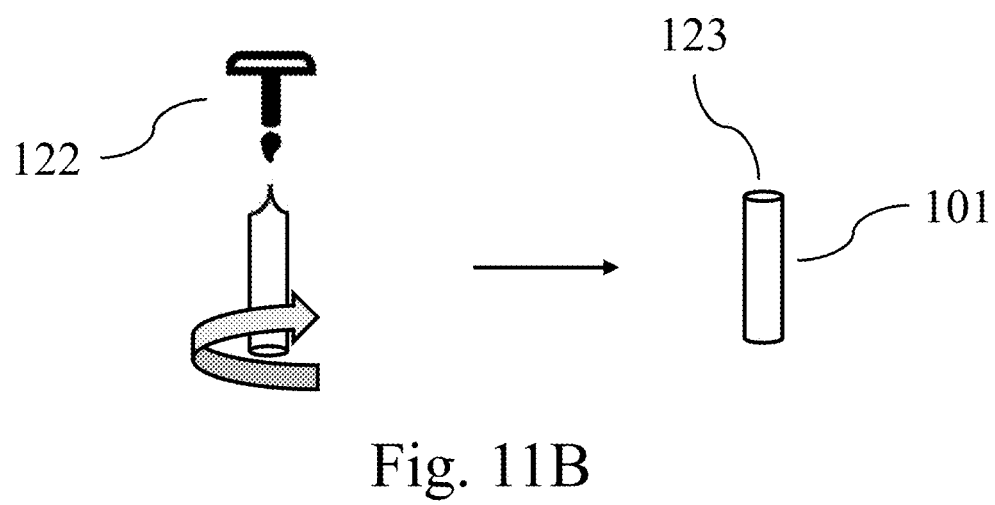
FIG. 11B illustrates step IV) of the process according to the invention for the preparation of a glass container.

FIG. 11 illustrates process 1 according to the invention for the preparation of a glass container 100. FIG. 11A illustrates process step I), II) and III), wherein in process step I) a glass tube 101 with a first 102 and a second end 103 is provided, the glass tube having a wall thickness of $d_w$ (not shown in FIG. 11A). In process step II), the glass tube is heated, while rotating around its major axis, to its softening point with a heating element (indicated by the candle flames shown on the left in FIG. 11A), preferably with a flame 122. In process step III) the heated glass tube is pulled along its major axis for stretching as shown on the right in FIG. 11A, thereby creating a container closure 123. In process step IV), depicted in FIG. 11B, container closure 123 is shaped to form a glass bottom 104 and a curved glass heel 105 (not shown in FIG. 11B) via which the glass bottom 104 is connected to the glass tube 101.

Figure 12A:
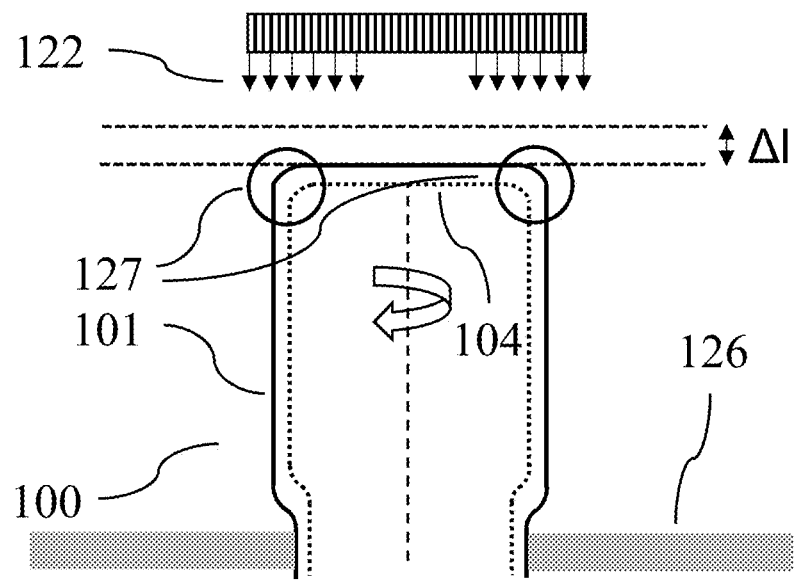
FIG. 12A illustrates a sub-step in the formation of the shape of the curved glass heel according to the present invention.

FIG. 12A illustrates a sub-step in the formation of the desired shape of the curved glass heel 105 in a glass container 100 according to the present invention. For the formation of the desired shape of the curved glass heel 105 a glass container 100 that is fixed in an fixing element 126 of a rotary machine and that is continuously rotated around its longitudinal axis as shown in FIG. 12A is brought in an upward position with the glass bottom showing to the top. In a first sub-step, the glass bottom is heated with a burner 122 in which the peripheral zone (as indicated by the arrows at the top of FIG. 11A) is heated to a larger extend compared to the middle section so that the area in the peripheral zone of the glass bottom 104 (i.e. in an area indicated by the circles in FIG. 12A that comprises the curved glass heel and the part of the glass tube 101 that is in contact with the curved glass heel 105) are particularly heated. As a result, a melting of the glass bottom 104 even into the wall of the hitherto cylindrical glass tube 101 occurs so that the glass contracts slightly under the surface tension and the bottom slightly sinks (see Δl in FIG. 12A). This leads to an increased accumulation of glass in the peripheral zone 127 of the glass bottom 104 (indicated by the circles in FIG. 12A), compared to a prior art process in which the surface of the glass floor is heated evenly and only to such a degree as necessary to enable bottom forming. The additional mass of glass in the peripheral zone 127 of the glass bottom 104 thus arises from the hitherto cylindrical wall of the glass tube 101 which is adjacent to the glass heel 105.

Figure 12B:
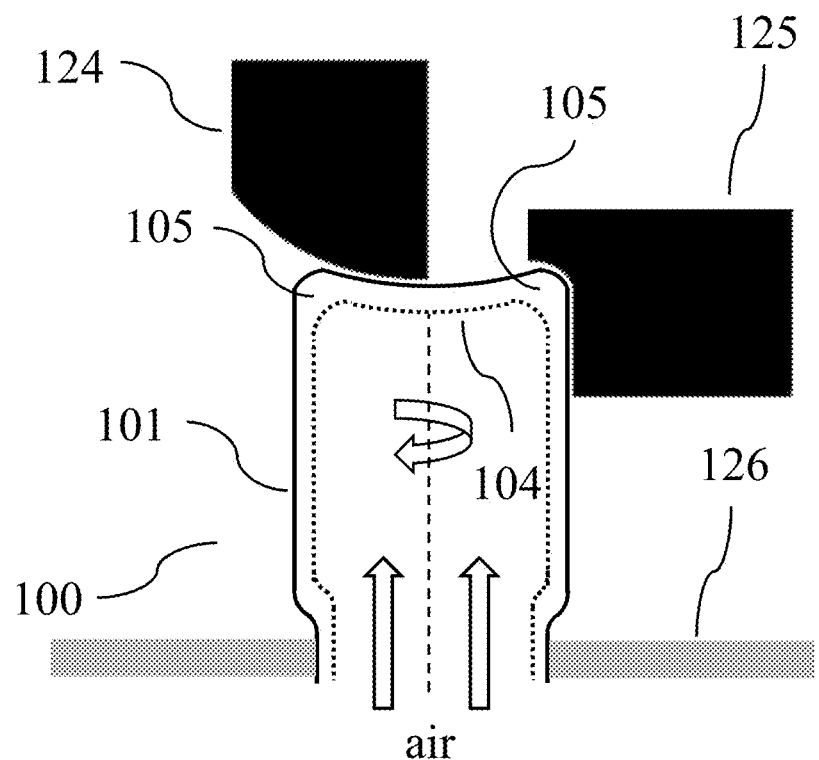
FIG. 12B illustrates a further sub-step in the formation of the shape of the curved glass heel according to the present invention.

FIG. 12B illustrates a further sub-step in the formation of the shape of the curved glass heel 105 in a glass container 100 according to the present invention. In this sub-step the glass container 100 is still continuously rotated around its longitudinal axis and the glass bottom 101 is concavely pushed inward by a die 124, while at the same time an air flow from below pushes the bottom 101 against the die 124 so that it does not sink under gravity. At the same time a molding roller 125 is provided which predetermines the outer shape of the curved glass heel 105 and which prevents the glass mass accumulated in the peripheral zone 127 from escaping to the outside. Simultaneously, the air flow and the die 124 cause the bottom 101 and the peripheral zone 127 to cool down quickly until it these areas are no longer shapeable.

Figure 13:
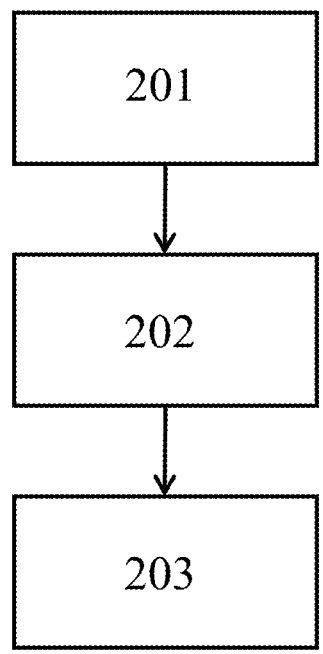
FIG. 13 shows a flow chart of another process according to the invention for packaging a pharmaceutical composition.

FIG. 13 shows a flow chart of a method or process 200 according to the invention for packaging a pharmaceutical composition. In a process step a) 201, the glass container 100 according to FIG. 4 is provided. In a process step b) 202, a pharmaceutical composition is filled into the interior volume $V_i$ of the glass container 100, and in a process step c) 203 the opening 112 of the glass container 100 is closed, thereby obtaining the closed glass container 121 of FIG. 10.

Measurement Methods

The following measurement methods are to be used in the context of the invention. Unless otherwise specified, the measurements have to be carried out at an ambient temperature of 23° C., an ambient air pressure of 100 kPa (0.986 atm) and a relative atmospheric humidity of 50%.

Determination of $r_i$, $r_o$ and $d_h$

The inner diameter $r_i$, the outer diameter $r_o$ and the thickness of the glass of the curved glass heel $d_h$ can be determined in an non-destructive manner using a profile projector. This approach is particularly suitable for glass containers that have been chemically and/or thermally tempered and that therefore cannot be easily sliced in half without the glass cracking or bursting. For determining $r_i$, $r_o$ and $d_h$ in a non-destructive manner radius templates are used that are commercially available, for example, from Mitutoyo Deutschland GmbH, Neuss, Germany. These templates are printed on a transparent foil which, after applying a line that indicates the ground-level bearing surface and a tangent that confines an angle of 45° with the ground-level bearing surface, is glued to the ground glass of a Mitutoyo PJ-3000 profile projector. The profile projector has a 10× magnification and is operated with transmitted light illumination. The vials are placed in Hallbrite® BHB (a butyloctyl salicylate obtainable from the Hallstar Company, Chicago, USA), which is filled into a glass bowl. Hallbrite® BHB is used to visualize the inner contour of the vial. It is ensured that the cross-section of the glass container that is inspected in the profile projector corresponds to the plane that is centrically located in the glass container and that comprises the longitudinal axis of the glass container, i.e. the axis that goes perpendicular through the center of the bottom (see FIGS. 7A and 7B).

To improve the measuring accuracy, $r_i$, $r_o$ and $d_h$ can also be determined from a physical cross-sectional cut parallel along to the longitudinal axis of the container (it is again ensured that the cross-section of the glass container corresponds to the plane that is centrically located in the glass container and that comprises the longitudinal axis as shown in FIGS. 7A and 7B). For preparation without breakage, the container may be embedded into transparent 2-component epoxy resin, for example STRUERS GmbH, EpoFix Resin, or other suitable materials. After curing of the epoxy resin, a cross-sectional cut parallel along to the container axis can be achieved by machine-supported sawing, grinding and polishing. Geometrical features of the container can then be determined (measured) by way of non-distorting image capturing and geometrical analysis software tools.

In the cross-sectional plane of the glass container that is evaluated by way of the two approaches described above $r_i$, $r_o$ and $d_h$ can be determined as follows, preferably is determined as follows:

For the determination of $d_h$ a tangent that confines an angle of 45° with the ground-level bearing surface (i.e. the surface that comes into contact with the exterior side of the container bottom if the container is placed upright) is placed at the exterior surface of the curved glass heel as shown in FIG. 8A (the dashed line indicates the 45°-tangent). The point of the exterior surface of the curved glass heel that comes into contact with the 45-tangent is designated as "A" (see FIG. 8A). Next, a straight line orthogonal to 45°-tangent is guided through point "A" (the dotted line in FIG. 8A indicates the orthogonal line). The position at which this straight orthogonal line breaks through the interior side of the curved glass heel is designated as "B" (see FIG. 8A). $d_h$ corresponds to the distance between points "A" and "B".

If there are more than only one point of exterior surface of the curved glass heel that comes into contact with the 45-tangent (as shown, for example, in FIG. 8B), point "A" corresponds to the point that is nearest to the outer surface of the glass tube. However, according to a particular embodiment of the glass container according to the invention the curved glass heel has a shape such that, when placing the 45°-tangent to the exterior surface of the curved glass heel, there is only one point of exterior surface of the curved glass heel that comes into contact with the 45-tangent.

For the determination of $r_o$ the intersection point of a first straight line that forms an elongation of the exterior side of the glass tube and the ground-level bearing surface is determined (see the vertical dashed line in FIG. 9A). If the curved glass heel laterally extends over the first straight line that forms an elongation of the exterior side, the first line goes through the curved glass heel until it reaches the ground-level bearing surface. The intersection point is designated as "C". Next, the point of the exterior surface of the glass container that contacts the ground-level bearing surface and that is closest to point "C" is determined. This intersection point is designated as "D" (see FIG. 9A). $r_o$ corresponds to the distance between points "C" and "D". In case of a curved glass heel having a circular arc $l_o$ at the outer surface of the curved glass heel with a length of $2 \times \pi \times r_o / 4$ (see, for example, the shape of the curved glass heel in FIG. 2), the distance between points "C" and "D" corresponds to the radius $r_o$ of the circle that is defined by the shape of the outer surface of the curved glass heel. However, the glass container according to the present invention is not limited to glass containers in which the circular arc $l_o$ at the outer surface of the curved glass heel has a length of $(90°/360°) \times 2\pi \times r_o$, but also comprises glass containers in which this circular arc $l_o$ is smaller (see, for example, the shape of the curved glass heel in FIG. 6 in which the outer area of the glass bottom somehow "extends" into the area of the curved glass heel) or glass containers in which the outer surface of the curved glass heel is not shaped in the form of a circular arc at all. In these cases $r_o$ actually does not correspond to the outer radius of the curved glass heel, but to width of the glass overhang in the area of the curved glass heel that is defined by the distance between points "C" and "D".

For the determination of $r_i$ a tangent that confines an angle of 45° with the ground-level bearing surface is placed at the interior surface of the curved glass heel as shown in FIG. 9B (the dashed line indicates the 45°-tangent). The point of the interior surface of the curved glass heel that comes into contact with the 45-tangent is designated as "E" (see FIG. 9B). Next, the largest quarter circle is determined that can be properly positioned on the inner contour of the curved glass heel, that comprises point "E" in the middle of the quarter circle and the ends of which do not extending into the mass of glass. $r_i$ corresponds to the radius of the largest quarter circles.

If there are more than only one point of interior surface of the curved glass heel that comes into contact with the 45°-tangent, point "E" corresponds to the geometric center between points "P1" and "P2", wherein point "P1" is the point on the 45°-tangent that comes into contact with the interior surface of the curved glass heel and that is located nearest to the glass tube and point "P2" is the point on the 45°-tangent that comes into contact with the interior surface of the curved glass heel and that is located nearest to the glass bottom. However, according to a particular embodiment of the glass container according to the invention the curved glass heel has a shape such that, when placing the 45°-tangent to the interior surface of the curved glass heel, there is only one point of interior surface of the curved glass heel that comes into contact with the 45-tangent.

Wall Thickness $d_w$ and Tolerance of Wall Thickness

The wall thickness and deviations from the mean value of the wall thickness (tolerance) are determined in accordance with the following standards for the respective type of hollow body:

DIN ISO 8362-1 for vials,
DIN ISO 9187-1 for ampoules.

Axial Load and Burst Pressure

The mechanical resistance against axial compression of the vial is determined by way of vertical load strength testing in accordance to DIN EN ISO 8113 ("Glass containers—Resistance to vertical load—Test methods"), where a compressive force is applied in axial direction and is increased with a constant load rate of 500 N/min until breakage of the container.

The mechanical resistance against internal pressure of the vial is determined by way of burst strength testing in accordance with DIN EN ISO 7458 ("Glass containers—Internal pressure resistance—Test methods"), where a hydraulic pressure is applied from inside of the vial and is increased with a constant load rate of 5.8 bar/s until breakage of the container.

EXAMPLES 1 and 2

A glass tube having an outer diameter of 16 mm and a wall thickness $d_w$ of 1 mm made of borosilicate glass is loaded into the head of a rotary machine. While rotating around its major axis the glass tube is heated to its softening point with flames and the heated glass is pulled along its major axis for stretching and creating a container closure. The container closure is shaped to form a glass bottom and a curved glass heel via which the glass bottom is connected to the glass tube. For the formation of the desired shape of the curved glass heel in the rotary machine the glass container is brought in an upward position with the glass bottom showing to the top as indicated in FIGS. 12A and 12B. In a first step, the glass bottom is heated with a burner in which the peripheral zones are heated to a larger extend compared to the middle section so that the area in the peripheral zone of the glass bottom (i.e. in an area that comprises the curved glass heel and the part of the glass tube that is in contact with the curved glass heel) are particularly heated. As a result, a melting of the glass bottom even into the wall of the hitherto cylindrical glass tube occurs so that the glass contracts slightly under the surface tension and the bottom slightly sinks (see AΔl in FIG. 12A). This leads to an increased accumulation of glass in the peripheral zone of the floor (see the circles in FIG. 12A) compared to a prior art process in which the surface of the glass floor is heated evenly. The additional mass of glass in the peripheral zone of the glass bottom thus basically arises from the hitherto cylindrical wall of the glass tube which is adjacent to the glass heel.

In a second step the glass bottom is concavely pushed inward by a die, while at the same time an air flow from below pushes the bottom against the die so that it does not sink under gravity. A support roller is provided at the same time which predetermines the outer shape of the heel and which prevents the glass mass accumulated in the peripheral zone from escaping to the outside. Simultaneously, the air flow and the die cause the bottom and the peripheral zone to cool down quickly until these areas are no longer shapeable.

By way of the above described process and by varying the shape of the support roller and the area of the glass bottom that is particularly heated, four glass containers which differ with respect to the shape of the curved glass heel have been prepared. In the production process it is ensured that essentially no damages of the glass surface occur (which also includes the avoidance of any glass-glass contacts between two vials) as otherwise the advantageous effects, i.e. high absolute strength levels, by improving the shape of the curved glass heel might be at least partially eliminated. However, the relative strength improvements described herein will also be observed when using glass with defects as long as equal defect levels are compared.

For each heel shape at least 50 glass containers have been prepared in the rotary machine. The shape of one of the curved glass heels corresponds to the shape of the heel in glass containers known in the prior art that are characterized by a basically concentric arrangement of the inner and the outer contour of the curved glass heel as shown in FIG. 2 (Comparative Example).

TABLE 1

| Glass container | $d_h$ [mm] | $r_i$ [mm] | $d_c$ [mm] | $d_w$ [mm] | $[100 \times (d_h^3 \times r_i)/(d_w \times d_c^2)] + (4.4 \text{ mm}^2/d_c)$ [mm] |
|---|---|---|---|---|---|
| Comparative Example | 1.00 | 0.57 | 16 | 1.00 | 0.50 |
| Example 1 | 1.55 | 1.70 | 16 | 1.00 | 2.75 |
| Example 2 | 1.65 | 0.90 | 16 | 1.00 | 1.85 |
| Example 3 | 1.55 | 1.05 | 16 | 1.00 | 1.80 |

Evaluation

From the above described glass containers the resistance to withstand axial loads and the burst pressure performance have been determined. For each heel shape at least 50 vials have been tested. The pressures that have been determined correspond to the pressures at which 10% of the vials burst. The results are shown in table 2, wherein the corresponding pressure values are standardised to the values that have been determined for the reference vial of the Comparative Example.

TABLE 2

| Glass container | resistance to axial load [%] | burst pressure performance [%] |
|---|---|---|
| Comparative Example | 100 | 100 |
| Example 1 | 133 | 178 |
| Example 2 | 316 | 141 |
| Example 3 | 146 | 139 |

As can be seen from the results shown in table 2, by adjusting the shape of the curved glass heel to ensure that $[100 \times (d_h^3 \times r_i)/(d_w \times d_c^2)] + (4.4 \text{ mm}^2/d_c)$ reaches a value above 0.55 mm the burst pressure performance and, at the same time, the resistance to axial loads can be significantly increased.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

LIST OF REFERENCE NUMERALS 100 glass container according to the invention
101 glass tube
102 first end of the glass tube 101
103 second end of the glass tube 101
104 glass bottom
05 curved glass heel
106 an outer area of the glass bottom
107 center of glass bottom
108 concave indentation
109 top region
110 body region
111 shoulder
112 opening
113 cross-sectional plane in the middle of the glass container 100
114 closure
115 ground-level bearing surface
116 45°-tangent at the exterior surface of the curved glass heel 105
117 straight line orthogonal to 45°-tangent 116
118 straight line forming an elongation of the glass tube 101
119 45°-tangent at the interior surface of the curved glass heel 105
120 largest quarter circle
121 closed glass container
122 heating element, preferably a flame
123 container closure
124 die
125 molding roller
126 fixing element of a rotary machine
127 peripheral zone of the glass bottom in which glass accumulates
200 process according to the invention for packaging a pharmaceutical composition
201 process step a)
202 process step b)
203 process step c)

What is claimed is:

1. A glass container for packaging a pharmaceutical composition, comprising:
   a glass tube with a first end and a second end, the glass tube having a wall thickness ($d_w$) and an outer diameter ($d_c$);
   a glass bottom with an outer area, the glass bottom closes the glass tube at the first end; and
   a curved glass heel extending from the outer area of the glass bottom to the first end of the glass tube, wherein the curved glass heel is defined by an outer radius ($r_o$), an inner radius ($r_i$), and a thickness of the glass ($d_h$) in the curved glass heel that differs from the wall thickness and wherein:

$[100 \times (d_h^3 \times r_i)/(d_w \times d_c^2)] + (4.4 \text{ mm}^2/d_c) > 0.55 \text{ mm}$.

2. The glass container according to claim 1, wherein $r_i > 0.7$ mm.

3. The glass container according to claim 1, wherein $r_i + d_h - r_o > 0$ mm.

4. The glass container according to claim 1, wherein the glass tube is a cylindrical glass tube and wherein the glass bottom is a circular glass bottom.

5. The glass container according to claim 4, wherein the circular glass bottom has a thickness that varies within an area from a center of the circular glass bottom to the outer area of the circular glass bottom, wherein a minimum thickness of the circular glass bottom is $d_{b,min}$ and wherein $d_h/d_{b,min} < 3.0$.

6. The glass container according to claim 1, wherein the glass container further includes a coating that at least partially superimposes at least one of an exterior surface and an interior surface of the glass tube.

7. The glass container according to claim 1, wherein the glass container is at least one of thermally tempered and chemically tempered.

8. The glass container according to claim 1, wherein the glass container further includes a top region with an inner diameter ($d_t$) and a body region in which an inner diameter of the glass tube is $d_b$, and wherein $d_b > d_t$.

9. The glass container according to claim 8, wherein the glass container further includes a shoulder that connects the body region with the top region, and the shoulder includes a shoulder angle ($\alpha$) that is in the range from 10° to 70°.

10. The glass container according to claim 9, wherein throughout the body region the wall thickness ($d_w$) of the glass tube is in a range from ±0.2 mm, based on a mean value of this wall thickness in the body region.

11. The glass container according to claim 1, wherein the glass container has an interior volume ($V_i$) in a range from 2 to 150 ml.

12. The glass container according to claim 1, wherein the glass container consists of one of a borosilicate glass, an aluminosilicate glass, a soda lime glass, and a fused silica.

13. A method for the preparation of a closed glass container, comprising:
   providing a glass container for packaging a pharmaceutical composition, the glass container including an interior volume ($V_i$), a glass tube with a first end and a second end, the glass tube having a wall thickness ($d_w$) and an outer diameter ($d_c$), a glass bottom with an outer area, the glass bottom closes the glass tube at the first end, a curved glass heel extending from the outer area of the glass bottom to the first end of the glass tube, wherein the curved glass heel is defined by an outer radius ($r_o$), an inner radius ($r_i$), and a thickness of the glass ($d_h$) in the curved glass heel that differs from the wall thickness and wherein: $[100 \times (d_h^3 \times r_i)/(d_w \times d_c^2)] + (4.4 \text{ mm}^2/d_c) > 0.55 \text{ mm}$;
   inserting the pharmaceutical composition into the interior volume $V_i$ of the glass container; and
   closing the glass container.

14. The method according to claim 13, wherein the step of closing the glass container includes contacting the glass container with a closure, covering an opening of the glass container with the closure, and joining the closure to the hollow body.

15. The method according to claim 14, wherein the step of joining the closure to the hollow body includes creating a form-fit of the glass container via a crimping step.

16. The method according to claim 13, wherein $r_i > 0.7$ mm.

17. The method according to claim 13, wherein $r_i + d_h - r_o > 0$ mm.

18. The method according to claim 13, the glass tube is a cylindrical glass tube and wherein the glass bottom is a circular glass bottom, wherein the circular glass bottom has a thickness that varies within the area from a center of the circular glass bottom to the outer area of the circular glass bottom, wherein a minimum thickness of the circular glass bottom is $d_{b,min}$ and wherein $d_h/d_{b,min} < 3.0$.

19. The method according to claim 13, wherein the glass container further includes a coating that at least partially superimposes at least one of an exterior surface and an interior surface of the glass tube.

20. A glass container for packaging a pharmaceutical composition, comprising:
   a glass tube with a first end and a second end;
   a glass bottom with an outer area, the glass bottom closes the glass tube at the first end; and
   a curved glass heel extending from the outer area of the glass bottom to the first end of the glass tube,
   wherein the curved glass heel is defined by an outer radius ($r_o$), an inner radius ($r_i$), and a thickness of the glass ($d_h$) in the curved glass heel,
   wherein: $r_i + d_h - r_o > 0.1$ mm.

* * * * *

UNITED STATES PATENT AND TRADEMARK OFFICE
CERTIFICATE OF CORRECTION

PATENT NO. : 11,376,191 B2  
APPLICATION NO. : 16/394519  
DATED : July 5, 2022  
INVENTOR(S) : Andreas Langsdorf et al.

It is certified that error appears in the above-identified patent and that said Letters Patent is hereby corrected as shown below:

In the Specification

Column 2  
At Line 66, please delete "$[100 \times (d_h^3 \times r_i) / (d_w d \times d_c^2)]$", and substitute therefore --$[100 \times (d_h^3 \times r_i) / (d_w \times d_c^2)]$--.

Column 3  
At Line 39, please delete "$[100 \times (d_h^3 33\ r_i) / (d_w \times d_c^2)]$", and substitute therefore --$[100 \times (d_h^3 \times r_i) / (d_w \times d_c^2)]$--.

Column 5  
At Line 9, please delete "$db,mi_n$", and substitute therefore --$d_{b,min}$--; and  
At Line 39, please delete "from)(50°/360°)", and substitute therefore --from (50°/360°)--.

Column 8  
At Line 37, please delete "$[100\times(d_h^3 \times r_i)/(d_w'd_c 2)]$", and substitute therefore --$[100 \times (d_h^3 \times r_i) / (d_w \times d_c^2)]$--.

Column 12  
At Line 39, please delete "$r_o$, Land", and substitute therefore --$r_o$, $r_i$ and--.

Column 14  
At Line 3, please delete "$d_b > d_c$", and substitute therefore --$d_b > d_t$--.

Column 17  
At Line 6, please delete "$(S_1)$,", and substitute therefore --$(s_1)$,--.

Column 23  
In the LIST OF REFERENCE NUMERALS, please delete "05 curved glass heel", and substitute therefore --105 curved glass heel--.

Signed and Sealed this  
Twenty-second Day of October, 2024

Katherine Kelly Vidal  
*Director of the United States Patent and Trademark Office*